US006617002B2

(12) United States Patent
Wood

(10) Patent No.: US 6,617,002 B2
(45) **Date of Patent: *Sep. 9, 2003**

(54) MICROPERFORATED POLYMERIC FILM FOR SOUND ABSORPTION AND SOUND ABSORBER USING SAME

(75) Inventor: Kenneth Brian Wood, St. Paul, MN (US)

(73) Assignee: Minnesota Mining and Manufacturing Company, St. Paul, MN (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/122,240

(22) Filed: Jul. 24, 1998

(65) Prior Publication Data

US 2001/0050197 A1 Dec. 13, 2001

(51) Int. Cl.[7] .................................................. B32B 3/10

(52) U.S. Cl. ......................... 428/131; 428/43; 428/134; 428/135; 428/136; 428/137; 428/138; 181/292; 181/293; 181/294; 181/295

(58) Field of Search ................................ 181/292, 293, 181/294, 295; 428/43, 131, 134, 135, 136, 137, 138

(56) References Cited

U.S. PATENT DOCUMENTS 3,621,934 A * 11/1971 Thrasher ................... 181/33 G
3,782,495 A 1/1974 Nassof ........................ 181/33
4,097,633 A * 6/1978 Focht ......................... 428/138
4,287,962 A 9/1981 Ingard et al.
5,298,694 A 3/1994 Thompson et al.
5,459,291 A 10/1995 Haines et al.
5,560,967 A * 10/1996 Isaksen ........................ 428/71
5,653,836 A 8/1997 Mnich et al.
5,700,527 A 12/1997 Fuchs et al.
5,962,107 A * 10/1999 Lowery et al. ............. 428/131

FOREIGN PATENT DOCUMENTS

EP 0 441 759 2/1991 ............. E04B/1/82
EP 0 816 583 2/1997 ............. E04B/1/84

OTHER PUBLICATIONS

Ingard, K.U., "Acoustic visco–thermal effects", *Notes on Sound Absorption Technology*, Chapter 2, pp. 2–1–2–35, copyright 1994 (no month).
Ingard, K.U., "Notes on Sound Absorption Technology", E–37, copyright 1994 (no month).
Maa, D.Y., "Microperforated–Panel Wideband Absorbers", *Noise Control Engineering Journal*, 29(3):77–84 (Nov.–Dec. 1987).
Wu, M.Q., "Micro–Perforated Panels for Duct Silencing", *Noise Control Eng. J.*, 45(2):69–77 (Mar.–Apr. 1997).

* cited by examiner

*Primary Examiner*—Terrel Morris
*Assistant Examiner*—Leanna Roché
(74) *Attorney, Agent, or Firm*—Merchant & Gould P.C.

(57) ABSTRACT

Microperforated polymeric films and sound absorbers using such films are provided. The microperforated polymeric films may be relatively thin and flexible and may further include holes having a narrowest diameter less than the film thickness and a widest diameter greater than the narrowest diameter. The microperforated polymeric films of a sound absorber may also have relatively large free span portions, which, in certain embodiments, may vibrate in response to incident sound waves.

26 Claims, 20 Drawing Sheets

Sound Absorption as a Function of Hole Diameter

| Hole Diameter (mils) | Percent Open Area(%) | $\alpha_p$ | $F_p$ (Hz) | $f_1$ (Hz) | $f_2$ (Hz) | $R_p$ | $f_2$ (Hz) | $f_3$ (Hz) | $R_N$ |
|---|---|---|---|---|---|---|---|---|---|
| | | | | | | | | | |
| 20 | .3 | .91 | 700 | 500 | 1200 | 2.4 | 1200 | - | - |
| 20 | .5 | .99 | 900 | 600 | 1700 | 2.8 | 1700 | - | - |
| 20 | 1.0 | .96 | 1300 | 850 | 2100 | 2.5 | 2100 | - | - |
| | | | | | | | | | |
| 10 | .5 | .84 | 1000 | 600 | 2400 | 4.0 | 2300 | 8600 | 3.7 |
| 10 | .75 | .94 | 1350 | 700 | 2900 | 4.1 | 2900 | 8500 | 2.9 |
| 10 | 1.0 | 1.0 | 1700 | 800 | 3400 | 4.2 | 3400 | 8700 | 2.6 |
| 10 | 1.5 | 1.0 | 1900 | 930 | 4000 | 4.3 | 4000 | 9170 | 2.3 |
| 10 | 2.0 | .97 | 2100 | 1100 | 4500 | 4.1 | 4500 | 8800 | 2.0 |
| 10 | 3.0 | .87 | 2400 | 1300 | 4900 | 3.8 | 4900 | 9000 | 1.8 |
| | | | | | | | | | |
| 6 | 1 | .84 | 1700 | 660 | 4600 | 7.0 | 4600 | 8700 | 7.9 |
| 6 | 1.5 | .95 | 2000 | 780 | 5400 | 6.9 | 5400 | 8700 | 1.6 |
| 6 | 2.0 | 1.0 | 2200 | 890 | 5800 | 6.5 | 5800 | 8800 | 1.5 |
| 6 | 3.0 | 1.0 | 2700 | 1050 | 6200 | 5.7 | 6200 | 8900 | 1.4 |
| 6 | 4.0 | .95 | 2900 | 1300 | 6100 | 4.7 | 6100 | 9000 | 1.5 |
| | | | | | | | | | |
| 4 | 2 | .85 | 2300 | 700 | 6400 | 9.1 | 6600 | 8800 | 1.3 |
| 4 | 3 | .96 | 2600 | 840 | 6950 | 8.3 | 6900 | 8900 | 1.3 |
| 4 | 5 | 1.0 | 3100 | 1050 | 6900 | 6.6 | 6900 | 9100 | 1.3 |
| 4 | 8 | .93 | 3500 | 1300 | 6700 | 5.2 | 6700 | 9300 | 1.4 |

Fig. 3

| Hole Section | Average Hole Diameter (mils) | Hole Length (mils) | $\alpha_p$ | $F_1$ ($\alpha$=0.4) (Hz) | $F_2$ ($\alpha$=0.4) (Hz) |
|---|---|---|---|---|---|
| | | | | | |
| A | 19 | 20 | .40@2800 | - | - |
| B | 12 | 10 | .76@2500 | 1500 | 4400 |
| C | 9 | 5 | .95@2350 | 1080 | 4800 |
| D | 8 | 3 | 1.0@2200 | 1010 | 5150 |
| E | 7 | 1 | 1.0@2300 | 960 | 5500 |
| Spectrum 700 | - | - | .95@2500 | 950 | 5500 |

Fig. 8

| Surface Density ($g/cm^2$) | Frequency (Hz) | Transmission Coefficient (%) |
|---|---|---|
| | | |
| .01 | 1000 | 100% |
| | 2000 | 100 |
| | 3000 | 50 |
| | | |
| .025 | 1000 | 80 |
| | 2000 | 20 |
| | 3000 | 9 |
| | | |
| .035 | 1000 | 40 |
| | 2000 | 10 |
| | 3000 | 4 |
| | | |
| .045 | 1000 | 25 |
| | 2000 | 6 |
| | 3000 | 3 |

Fig. 14

MICROPERFORATED POLYMERIC FILM FOR SOUND ABSORPTION AND SOUND ABSORBER USING SAME

FIELD OF THE INVENTION

The present invention generally relates to sound absorption and, more particularly, to microperforated polymeric films for sound absorption and sound absorbers using such films.

BACKGROUND OF THE INVENTION

Sound absorbers have been widely used in a number of different disciplines for absorbing sound. The most common sound absorbers are fiber-based and use fibrous materials such as fiberglass, open-cell polymeric foams, fibrous spray-on materials often derived from polyurethanes, and acoustic tile (an agglomerate of fibrous and/or particulate materials). Such fibrous-based sound absorbers rely on frictional dissipation of sound energy in interstitial spaces and can advantageously provide relatively broad-band sound absorption. Despite their advantages in broad-band absorption, fiber-based sound absorbers have significant inherent disadvantages. Such sound absorbers can readily release particulate matter and deleteriously degrade the air quality of the surrounding environment. Some fiber-based sound absorbers are also sensitive to heat or fire and/or require expensive treatment to provide heat/fire resistance. Consequently, fiber-based sound absorbers are of limited use in many environments.

Perforated sheets have also been used in sound absorbers. Typically, these sheets include relatively thick perforated material, such as metal, having relatively large hole diameters (e.g., greater than 1 mm hole diameters). The perforated sheets are commonly used in two manners. They are often used alone with a reflective surface to provide narrow band sound absorption for relatively tonal sounds. They are also used as facings for fibrous materials to provide sound absorption over a wider spectrum. In the later case, the perforated sheets typically serve as protection, with the fibrous materials providing the sound absorption. Microperforated, sheet-based sound absorbers have also been suggested for sound absorption. Conventional micro perforated sheet-based sound absorbers use either relatively thick (e.g., greater than 2 mm) and stiff perforated sheets of metal or glass or thinner perforated sheets which are provided externally supported or stiffened with reinforcing strips to eliminate vibration of the sheet when subject to incident sound waves.

Fuchs, U.S. Pat. No. 5,700,527, for example, teaches a sound absorber using relatively thick and stiff perforated sheets of 2–20 millimeter glass or synthetic glass. Fuchs suggests using thinner sheets (e.g., 0.2 mm thick) of relatively stiff synthetic glass provided the sheets are reinforced with thickening or glued on strips in such a manner that incident sound cannot exite the sheets to vibrate. In this case the thin, reinforced sheet is positioned 24 inches from an underlying reflective surface. Mnich, U.S. Pat. No. 5,653,386, teaches a method of repairing sound attenuation structures for aircraft engines. The sound attenuation structures commonly include an aluminum honeycomb core having an imperforate backing sheet on one side, a perforated sheet of aluminum (with aperture diameters of about 0.039 to 0.09 inches) adhered to the other side, and a porous wire cloth adhesively bonded to the perforated aluminum sheet. According to Mnich, the sound attenuation structure may be repaired by removing a damaged portion of the wire cloth and adhesively bonding a microperforated plastic sheet to the underlying perforated aluminum sheet. In this manner, the microperforated plastic sheet is externally supported by the perforated aluminum sheet to form a composite, laminated structure which provides similar sound absorption as the original wire cloth/perforated sheet laminated structure.

While these perforated sheet-based sound absorbers may overcome some of the inherent disadvantages of fiber-based sound absorbers, they are expensive and/or of limited use in many applications. For instance, the use of very thick and/or very stiff materials or use of thickening strips or external support for the perforated sheets limits the use of sound absorbers using such sheets. The necessary thickness/stiffness or strips/external support also makes the perforated sheets expensive to manufacture. Finally, the perforated sheets must be provided with expensive narrow diameter perforations or else used in limited situations involving tonal sound. For example, to achieve broad-band sound absorption, conventional perforated sheets must be provided with perforations having high aspect ratios (hole depth to hole diameter ratios). However, the punching, stamping or laser drilling techniques used to form such small hole diameters are very expensive. Accordingly, the sound absorption industry still seeks sound absorbers which are inexpensive and capable of wide use. The present invention solves these as well as other needs.

SUMMARY OF THE INVENTION

The present invention generally provides relatively thin and flexible microperforated polymeric film for sound absorption and sound absorbers employing such film. A sound absorber, in accordance with one embodiment of the invention, includes a surface and a microperforated film having a bending stiffness of $10^7$ dyne-cm or less disposed near the surface such that the film and the surface define a cavity therebetween. The microperforated film includes a plurality of microperforations and a free span portion spanning at least part of the cavity. In some embodiments, the free span portion is capable of vibrating in response to incident sound waves at a particular frequency in the audible frequency spectrum, while the sound absorber absorbs sound.

A microperforated polymeric film for use in a sound absorber, in accordance with one embodiment of the invention, includes a polymeric film having a thickness and a plurality of microperforations defined in the polymeric film. The microperforations each have a narrowest diameter less than the film thickness and a widest diameter greater than the narrowest diameter. The narrowest diameter may, for example, range from 10 to 20 mils or less. This microperforated polymeric film may also be relatively thin and flexible.

The above summary of the present invention is not intended to describe each illustrated embodiment or every implementation of the present invention. The Figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which:

FIG. 3 is a table which illustrates the effects of hole diameter on sound absorption;

FIG. 8 is a table illustrating various sound absorption spectrum characteristics;

FIG. 14 illustrates a table of transmission coefficients as a function of frequency and surface density;

Figure 1:
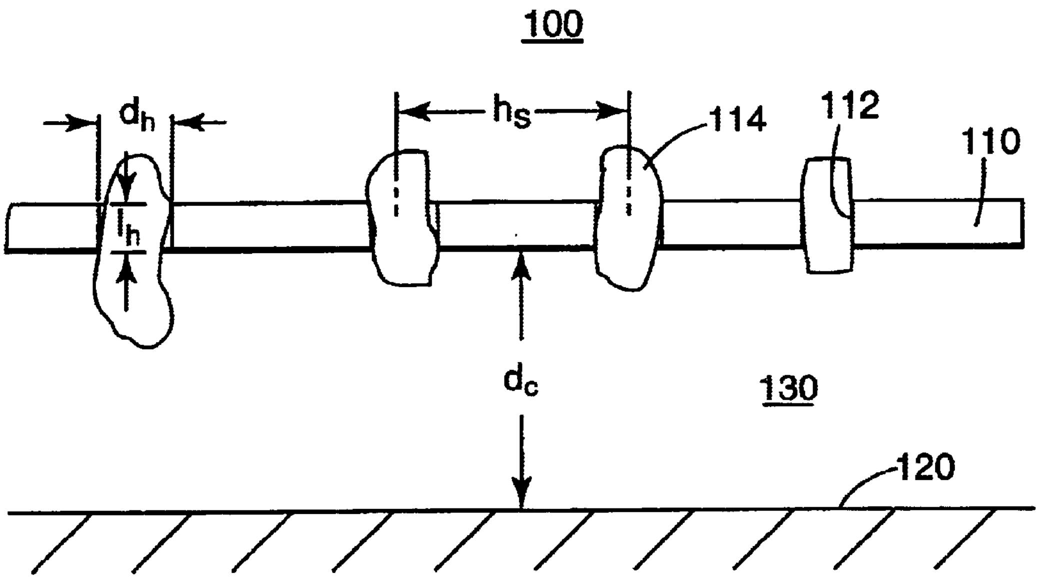
Fig. 1 (PRIOR ART)
FIG. 1 illustrates a conventional perforated sheet-based sound absorber.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

FIG. 1 schematically illustrates a perforated sheet-based sound absorber. The sound absorber 100 generally includes a perforated sheet 110 disposed near a reflecting surface 120 to define a cavity 130 therebetween. The perforated sheet 110 generally includes a plurality of perforations or holes 112 having a diameter $d_h$ and a length $l_h$ corresponding to the thickness of the sheet 110. As will be explained below, the hole diameter $d_h$ and length $l_h$ as well as the depth of the cavity $d_c$ and the spacing $h_s$ of the holes 112 have a significant impact on the sound absorption capabilities of the sound absorber 100. Conceptually, the sound absorber 100 may be visualized as a resonating system which includes, as a mass component, plugs 114 of air which vibrate back and forth in the holes 112 and, as a spring component, the stiffness of the air in the cavity 130. In response to incident sound waves, the air plugs 114 vibrate, thereby dissipating sound energy via friction between the moving air plugs 114 and the walls of the holes 112.

Figure 2:
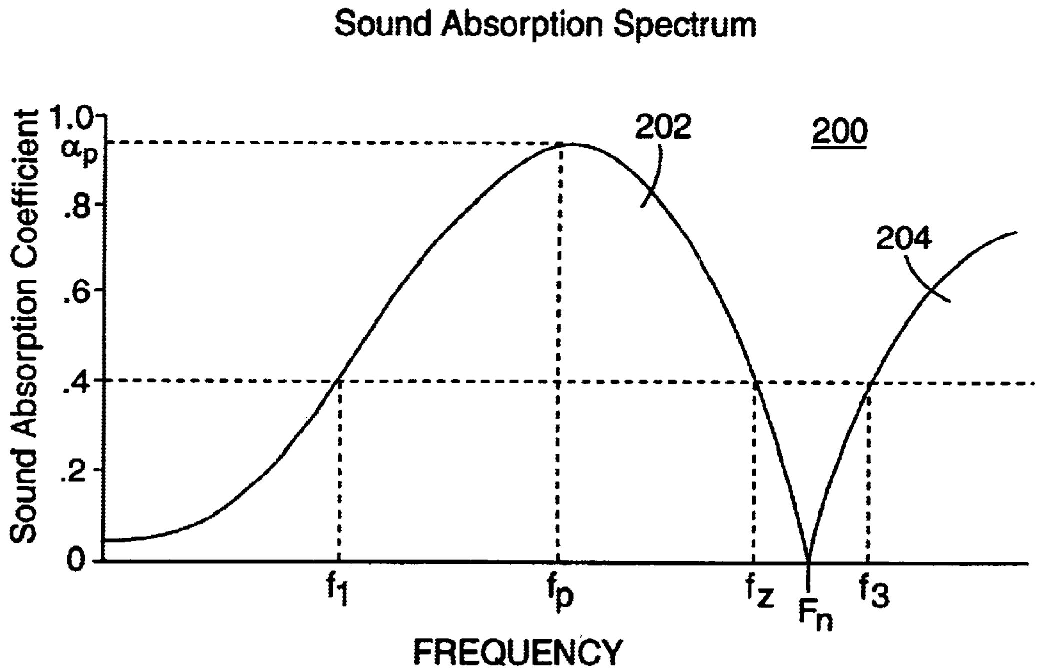
FIG. 2 illustrates an exemplary sound absorption spectrum for a perforated sheet-based sound absorber.

FIG. 2 illustrates an exemplary sound absorption spectrum for a perforated sheet-based sound absorber. The sound absorption spectrum 200 generally expresses the sound absorption coefficient (α) of a sound absorber as a function of frequency. The sound absorption coefficient α may be expressed by the relationship:

$$\alpha(f)=1-A_{ref}(f)/A_{inc}(f) \quad [1]$$

where $A_{inc}(f)$ is the incident amplitude of sound waves at frequency f, and $A_{ref}(f)$ is the reflected amplitude of sound waves at frequency f. The sound absorption spectrum 200 generally includes a peak absorption coefficient ($\alpha_p$) at frequency $F_p$ in a primary peak 202, a secondary peak 204, and a nodal frequency $F_n$ between the primary and secondary peaks 202 and 204 at which the absorption coefficient α reaches a relative minimum. The quality or performance of the sound absorption spectrum may be characterized using the frequency range $f_1$ to $f_2$ over which the absorption coefficient α meets or exceeds 0.4 and the frequency range $f_2$ to $f_3$ between the primary peak 202 and secondary peak 204 over which the absorption coefficient α falls below 0.4. Typically, it is desired to maximize the primary peak breadth ratio $f_2/f_1(R_p)$ and minimize the primary node breadth ratio $f_3/f_2$ ($R_n$).

FIG. 3 is a table which illustrates the effects of hole diameter on sound absorption. The normal incident sound absorption coefficients presented in FIG. 3 were determined using modeling techniques for rigid perforated film-based sound absorbers presented in Ingard, Notes on Sound Absorption, Chapter 2. In particular, normal incident sound absorption coefficients as a function of frequency were calculated based on the following parameters: hole diameter $h_d$, hole length $h_l$ (corresponding to the thickness of the film), cavity depth $c_d$, and hole spacing $h_s$ (e.g., as diagrammed in FIG. 1). FIG. 3 presents for each hole diameter the peak absorption coefficient $\alpha_p$, the peak frequency $F_p$ at which the peak absorption coefficient $\alpha_p$ occurs, frequencies $f_1$ and $f_2$ between which α meets or exceeds 0.4, the breadth ratio $R_p$, the frequencies $f_2$ and $f_3$ between which the absorption coefficient α falls below 0.4, and the breadth ratio $R_n$. The results were obtained using a hole length/film thickness of 10 mils (0.25 mm). For each hole diameter, the hole spacing was varied so as to encompass the peak absorption coefficient and the broadest absorption spectrum (based on the ratio $R_p$).

As can be seen from FIG. 3, as hole diameter decreases, the quality of the sound absorption spectrum increases. Consequently, with sound absorbers using perforated sheets, it is desirable to decrease the diameter of the perforations in order to achieve broad-band sound absorption (e.g., $R_p \geqq 2.0$). Known sound absorbers, however, have not been able to achieve broad-band sound absorption without undue expense. For example, as discussed above, prior microperforated sheet-based sound absorbers require expensive laser-drilled holes to achieve small aspect ratios and also require very stiff and/or very thick materials or the use of external support structures or thickening strips to reinforce and eliminate vibration of the perforated sheet. The present invention overcomes these deficiencies and provides microperforated films, including thin and flexible microperforated films, capable of broad-band sound absorption, and sound absorbers which are inexpensive and capable of wide use. It should be stressed and noted as reading the description that the present invention defies conventional wisdom by teaching and showing the desirability of using relatively thin and flexible microperforated polymeric films for sound absorption without substantial external support of the films or reinforcing of the films with thickening strips to prevent vibration of the films in response to incident sound waves.

Figure 4:
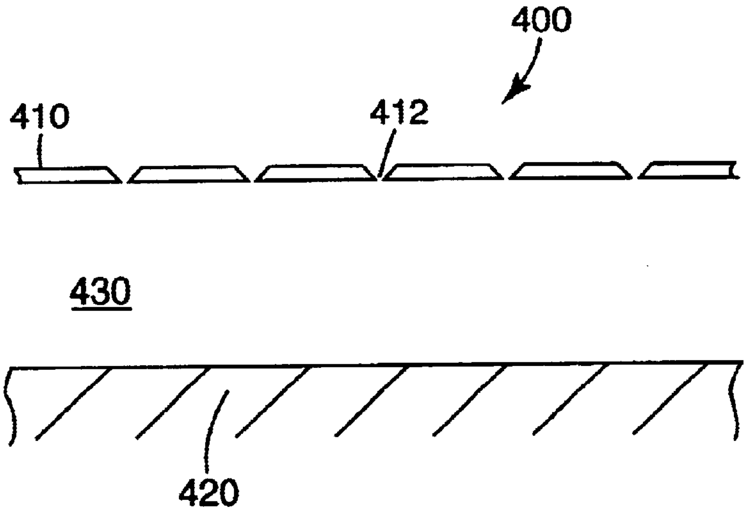
FIG. 4 illustrates an exemplary sound absorber in accordance with one embodiment of the invention.
Figure 5A:
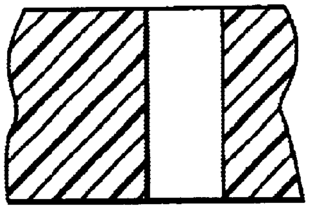
FIGS. 5A–5C illustrate exemplary hole cross-sections in accordance with various embodiments of the invention.
Figure 5B:
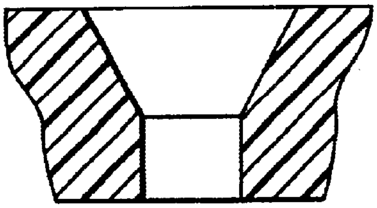
Figure 5C:
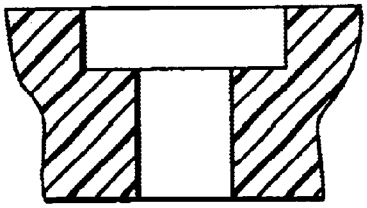

FIG. 4 illustrates an exemplary sound absorber using a relatively thin and flexible microperforated polymeric film in accordance with one embodiment of the invention. The exemplary sound absorber 400 typically includes a relatively thin and flexible microperforated polymeric film 410 disposed near a reflecting surface 420 to define a cavity 430 therebetween. The microperforated polymeric film 410 is typically formed from a solid, continuous polymeric material which is substantially free of any porosity, interstitial spaces or tortuous-path spaces. The film typically has a bending stiffness of about $10^6$ to $10^7$ dyne-cm or less and a thickness less than 80 mils (2 mm) and even about 20 mils or less. The microperforated polymeric film 410 typically includes microperforations or holes 412 having a narrowest diameter less than the thickness of the film 410. The type of polymer as well as the specific physical characteristics (e.g., thickness, bending stiffness, surface density, hole diameter, hole spacing, hole shape) of the film 410 can vary as discussed below. Typically, the film 410 has a substantially uniform thickness over the entire film. That is, the film is free of reinforcing or thickening strips and has a uniform thickness with the exception of possible variations in the vicinity of the microperforations, which may result from the process of forming the microperforations and/or displacing of thin skins, and natural variations in the manufacturing processes discussed below.

The microperforated polymeric film 410 may be disposed near the reflecting surface 420 in a number of different manners. For example, the film 410 may be attached to a structure which includes the reflecting surface 420. In this case, the film 410 may be attached on its edges and/or its interior. The film 410 may also be hung, similar to a drape, from a structure near the reflecting surface 420. Advantageously, the structure may allow the microperforated film 410 to span relatively large areas without external support. While, in some instances, the free spanning portion (s) (i.e., the dimension of the film over which the film is not in contact with an external structure) of the film vibrates in response to incident sound waves, it has been found that the vibration, if any, may fail to significantly impact sound absorption. By way of example and not of limitation, suitable free span portions may range from about 100 mils (2.5 mm) on up, with the upper limit being delineated solely by the surrounding environment. Moreover, while the illustrated reflecting surface 420 is flat, the invention is not so limited. The contour of the reflecting surface 420 can vary depending on the application.

As noted above, a number of factors affect the sound absorption characteristics of a sound absorber. This embodiment primarily concerns the characteristics of the microperforated film 410 including the shape of the holes as well as physical properties of the film. Other factors such as hole spacing, cavity depth and reflective surface 420 characteristics may be optimized for the particular application. For example, the cavity depth and/or reflecting surface 420 may be adjusted to optimize the sound absorption spectrum for any particular type of microperforated polymeric film. For the frequency range most commonly of interest in sound absorption (roughly 100–10000 Hz), an average cavity depth of between 0.25 inches and 6 inches may be chosen. Variable cavity depths may be used in order to broaden the sound absorption spectrum. Also, in some instances, particularly involving non-normal sound incidence, it may be useful to partition the backing cavity. Hole spacing can also be varied to optimize the sound absorption spectrum for a given microperforated polymeric film. For many applications, hole spacing will typically range from about 100 to 4,000 holes/square inch. The particular hole pattern may be selected as desired. For example, a square array may be used; alternatively, a staggered array (for example, a hexagonal array) may be used, in order to provide for improved tear strength of the microperforated film. The hole size and/or spacing may also vary over the film if desired.

With regard to the holes 412, the holes 412 typically have a narrowest diameter less than the film thickness and typically less than 20 mils. The hole shape and cross-section can vary. The cross-section of the hole 600 may be circular, square, hexagonal and so forth, for example. For non-circular holes, the term diameter is used herein to refer to the diameter of a circle having the equivalent area as the non-circular cross-section. The holes 412 may have relatively constant cross-sections over their lengths similar to conventional techniques. In accordance with one embodiment, the holes 412 have a varying diameter ranging from a narrowest diameter less than a film thickness to a widest diameter. While by no means exhaustive, illustrative hole shapes are shown in FIGS. 5A–5C and 6.

Figure 6:
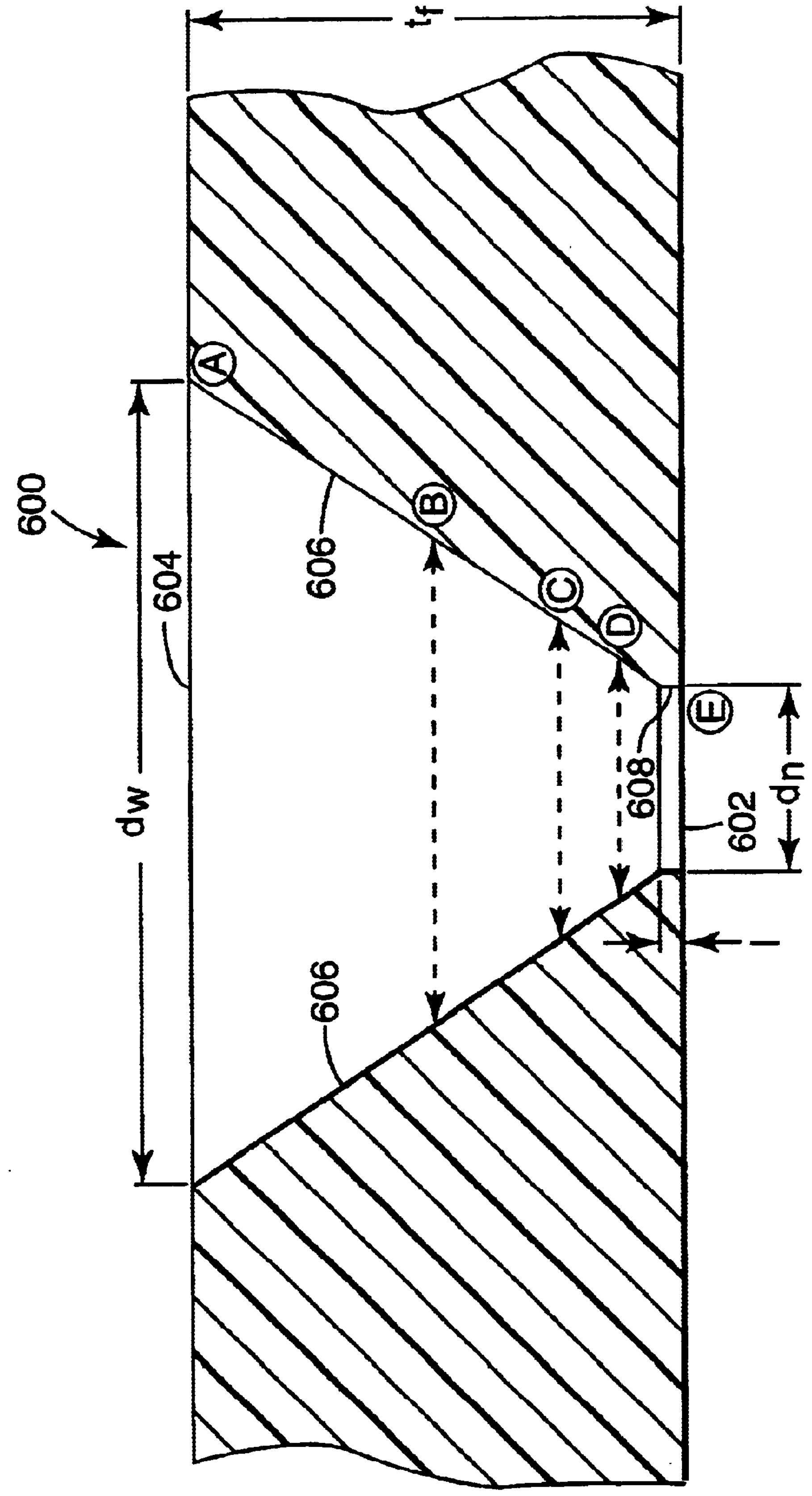
FIG. 6 illustrates an exemplary hole cross-section in accordance with another embodiment of the invention.

FIG. 6, in particular, illustrates an exemplary tapered hole 600 in accordance with one embodiment of the invention. The holes 412 discussed above may take this shape. The hole 600 generally has tapered edges 606 and includes a narrowest diameter ($d_n$) 602 less than the film thickness $t_f$ and a widest diameter ($d_w$) 604 greater than the narrowest diameter 602. This provides the hole 600 with an aspect ratio (e.g., $t_f$:$d_n$) greater than one and if desired substantially greater than one. Further below, a manufacturing process capable of inexpensively producing tapered holes (and other holes) will be discussed. This manufacturing method can achieve high aspect ratios without expensive methods such as laser-drilling or boring.

The exemplary hole 600 typically includes generally tapered edges 606 which, near the narrowest diameter 602, form a lip 608. The lip 608, as will be discussed below, can result from the manufacturing process (e.g., during displacement of a thin skin). The lip 608, while typically somewhat ragged, typically has a length l of 4 mils or less and more often about 1 mil over which the average diameter is about equal to the narrowest diameter 602. The dimensions of the narrowest diameter 602 and widest diameter 604 of the hole 600 can vary, which in turn, affect the slope of the tapered edges 606. As noted above, the narrowest diameter 602 is typically less than the film thickness and may, for example, be about 50% or less or even 35% or less of the film thickness $t_f$. In absolute terms, the narrowest diameter may, for example, be 20 mils or less, 10 mils or less, 6 mils or less and even 4 mils or less, as desired. The widest diameter 604 may be less than, greater than, or equal to the film thickness $t_f$. In certain embodiments, the widest diameter ranges from about 125% to 300% of the narrowest diameter 602.

Figure 7:
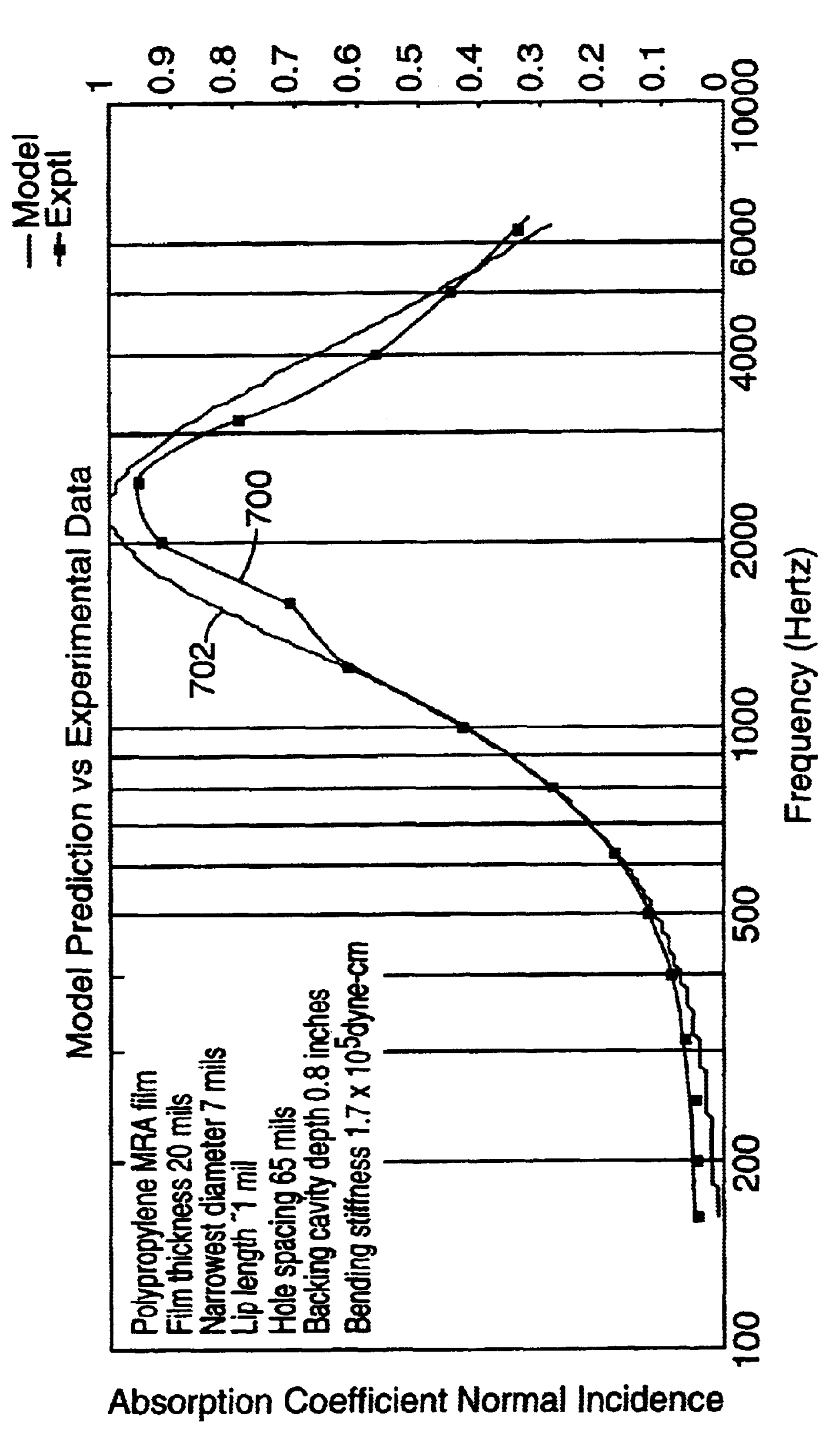
FIG. 7 illustrates an exemplary sound absorption spectrum for a microperforated polymeric film having tapered holes.

The exemplary hole 600 provides significant advantages over conventional perforations both as a result of the high aspect ratio and other features of its shape. Illustrating the advantages, FIG. 7 depicts a sound absorption coefficient spectrum 700 as a function of frequency for a microperforated polymeric film having a bending stiffness of $1.7 \times 10^5$ dyne-cm, a thickness of 20 mils, and tapered holes 600 having a hole spacing of 65 mils, a widest diameter of 32 mils, a narrowest diameter of 7 mils and a lip of about 1 mil.

The spectrum 700 was generated, using well-known impedance tube testing, by spanning a 28 mm (1120 mils) diameter section of the microperforated polymeric film across an impedance tube. Specifically, the edges of the film were adhered to the flange of an impedance tube using double-sided adhesive so that the film was disposed normal to incident sound. The sealed terminal end of the impedance tube provided the reflecting surface and defined the cavity depth. The film sample was then exposed to normal incidence sound and the absorption coefficient obtained as a function of frequency, using ASTM 1050E protocol. The experimentally-obtained absorption coefficient spectrum 700 is illustrated in conjunction with a model curve 702 generated using Ingard's model, noted above, for a rigid microperforated film based sound absorber having the same cavity depth (0.8 inches) and hole spacing using a narrowest diameter of 7 mils and a film thickness/hole length of 1 mil. As can be seen, FIG. 7 illustrates excellent agreement between the experimental data curve 700 and the model curve 702. The microperforated polymeric film of FIG. 7 also provides broad-band sound absorption and has a breadth ratio $R_p$ of about 5.5.

FIG. 8 is a table further illustrating the advantages of the tapered hole 600. FIG. 8 illustrates the peak absorption coefficient $\alpha_p$ and the frequency range $f_1$ to $f_2$ over which $\alpha$ is greater than or equal to 0.4 for both the exemplary spectrum 700 as well as model spectrums generated using Ingard's equation at hole cross-sections A–E (shown in FIG. 6). For hole slices A–E, numerical values for hole length (i.e., the distance between the hole slice and the surface having the narrowest diameter) and average hole diameter below the noted hole slice were entered into Ingard's model. For example, for hole slice A, a hole length of 20 mils (in this case, corresponding to the thickness of the film) and a hole diameter of 19 mils (corresponding to the average hole diameter over the specified length) were used. FIG. 8 illustrates that a tapered hole 600 having a narrowest diameter of 7 mils and a lip of 1 mil behaves quite characteristically of a straight-wall hole with a 7–9 mil diameter and a length of 1–5 mils. Consequently, the exemplary hole 600 provides an effective hole length (e.g., 1–5 mils) much less than film thickness (20 mils).

The providing of high film thickness relative to effective hole length provides tremendous advantages. For instance, the acoustic performance of a short hole length can be combined with the strength and durability of a thick film if desired. This provides several practical advantages. For example, for a straight-wall hole having a length of 10 mils and a diameter of 4 mil, an optimum hole spacing (e.g., $\alpha$>0.4 and high $\alpha_p$) is about 20 mils. This corresponds to a hole density of around 2500 holes per square inch and to a percentage open area based on narrowest hole diameter of around 3%. Using a tapered hole having a narrowest diameter of 4 mil and a lip of 1 mil, an "optimum" sound absorption spectrum essentially equivalent to the above can be obtained with a hole spacing of 35 mils. This corresponds to a hole density of around 800 holes per square inch and a percentage open area of around 1%. For a given sound absorption performance, the much lower hole density allowed by the use of tapered holes may provide for much more cost-effective manufacturing. Also, the reduced open area may allow the microperforated film to be more effectively used as a barrier to liquid water, water vapor, oil, dust and debris, and so forth.

The physical characteristics of the microperforated polymeric film 410, such as the film thickness, surface density, and bending stiffness can also vary depending on the application for which the sound absorber is designed. In particular, the physical characteristics of the film may, in some cases, allow the film to vibrate in response to incident sound or, on the other hand, may be selected to reduce vibration or alter the frequency of film vibration without the expense of adding thickening strips or glued-on strips to the polymeric film. For example, as will be discussed below, additives may be included in the polymer to vary desired physical characteristics of the film 410 to reduce film vibration or shift the resonant frequency of the film 410 to a frequency out of the range of interest. The use of additives can, for example, modify the film vibration characteristics while still providing a microperforated polymeric film with a substantially uniform thickness (e.g., no discrete strips of material).

FIGS. 9–13 illustrate sound absorption spectrums for sound absorbers using relatively thin and flexible microperforated polymeric films having various hole characteristics and physical characteristics. Unless otherwise noted, each of the sound absorption coefficient spectrums were determined, using well-known impedance tube testing, by spanning a circular portion of microperforated polymeric film having a diameter of 28 mm across an impedance tube in a similar manner as discussed above. The use of a 28 mm free span is not intended to limit the scope of the invention. On the contrary, as noted above, sound absorbers using relatively thin and microperforated polymeric films having free spans ranging from 100 mils on up may be used. While details of the hole characteristics are discussed below, it is further noted that the holes of the tested films are typically tapered similar to the hole 600 discussed above. FIGS. 9–13 generally illustrate that relatively thin and flexible microperforated polymeric film may be widely used for sound absorption, including broad-band sound absorption, without any need for reinforcing strips or substantial external support.

Figure 9:
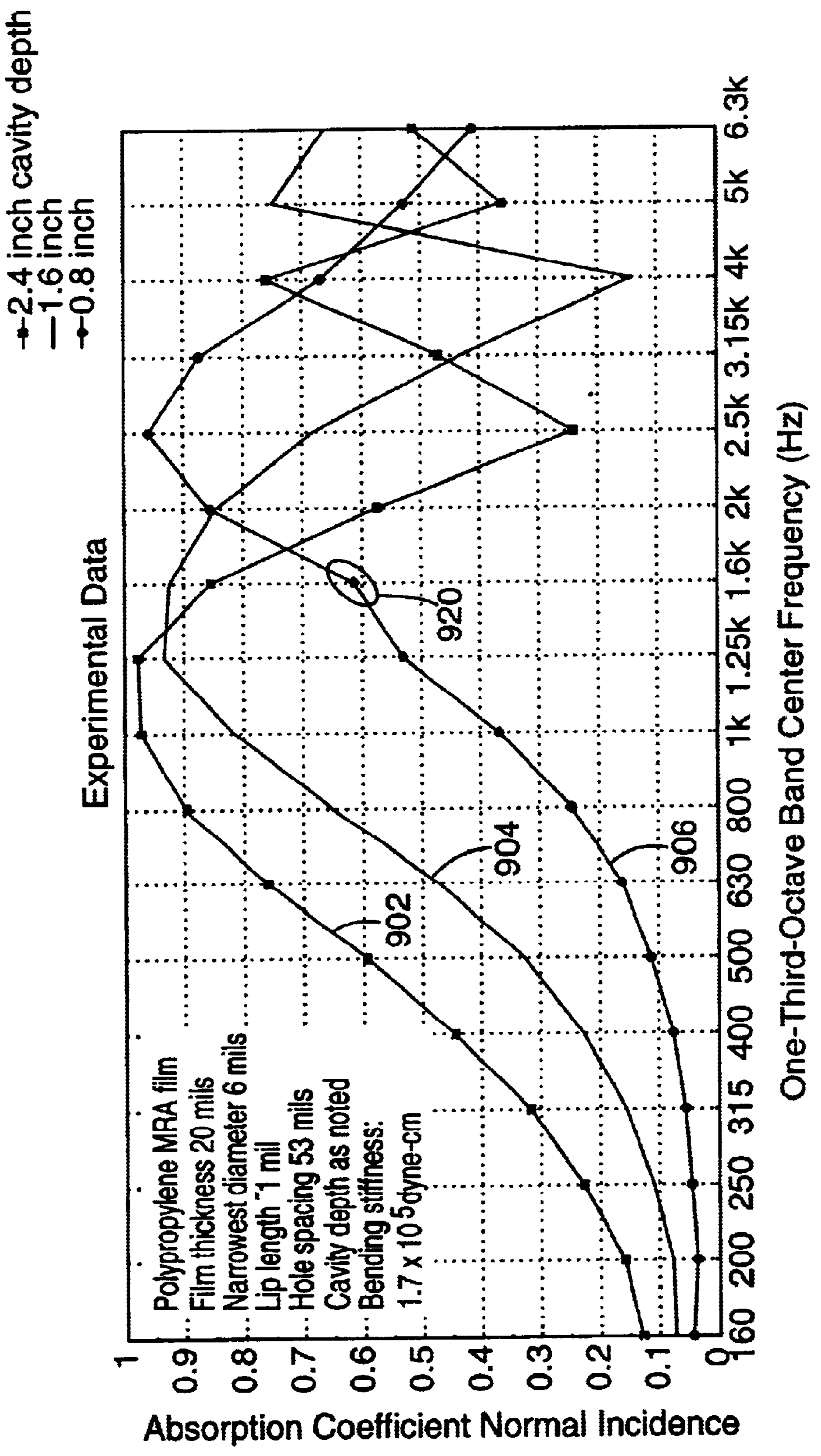
FIGS. 9–13 illustrate exemplary sound absorption spectrums for various sound absorbers using microperforated polymeric film in accordance with various embodiments of the invention.
Figure 10:
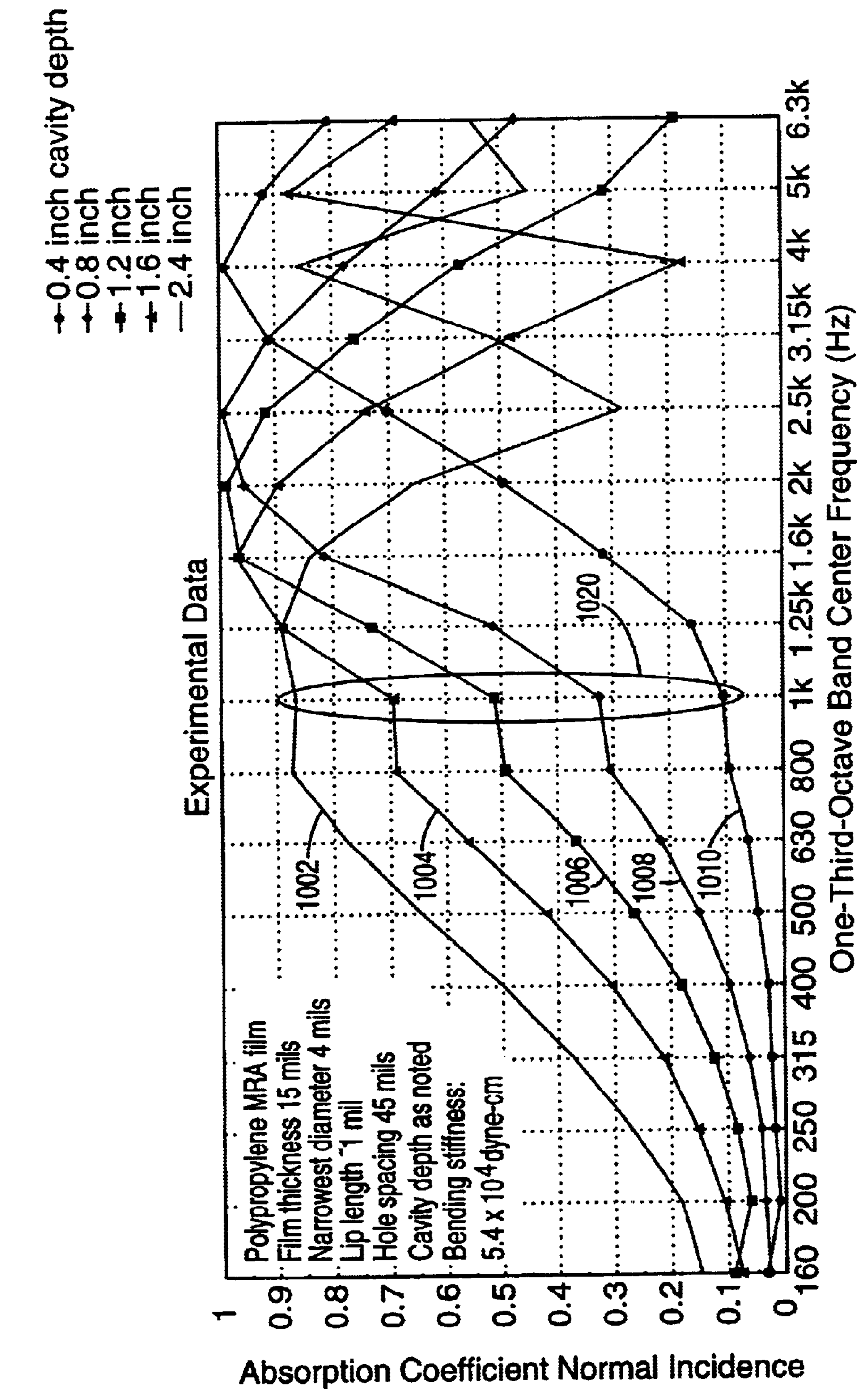

FIG. 9 illustrates sound absorption coefficient spectrums for microperforated polypropylene film having a bending stiffness of $1.7\times10^5$ dyne-cm, film thickness of about 20 mils, a narrowest diameter of about 6 mils, a lip length of about 1 mil and hole spacing of 53 mils. Each of the sound absorption spectrums 902, 904 and 906 represent a sound absorption coefficient spectrum for a different cavity depth as noted. FIG. 10 illustrates sound absorption coefficient spectrums for microperforated polypropylene film having a somewhat lower bending stiffness ($5.4\times10^4$ dyne-cm), a film thickness of about 15 mils, a narrowest diameter of about 4 mils, a lip length of about 1 mil and hole spacing of about 45 mils. The sound absorption spectrums 1002–1010 of FIG. 10 also vary with the cavity depth as noted. In each of FIGS. 9 and 10, notches 920 and 1020 in the primary peaks of the absorption spectrums 406 and 1002–1010 occur due to film vibration (i.e., motion of the film resulting from resonant transfer between film kinetic energy and film potential energy of bending), typically at the film's fundamental resonant frequency (hereinafter "resonant frequency"). It is believed that the notch results from the fact that the film motion subtracts slightly from the motion of the plugs of air relative to the walls of the microperforations, thus resulting in a slightly reduced absorption coefficient at that frequency. In particular, in FIG. 9, the notch 920 occurs at about 1600 hertz, while in FIG. 10, the notch 1020 occurs at about 1000 hertz.

FIGS. 9 and 10 clearly demonstrate that, despite the small anomalous notch attributable to film resonance, the microperforated polypropylene films exhibit excellent sound absorption. For example, the spectrums of FIG. 9 have peak breadth ratios ($R_p$) ranging from of about 6 to 7, and the spectrums of FIG. 10 have peak breadth ratios ($R_p$) ranging from about 5 to 8. Moreover, film vibration in response to incident sound typically only affects sound absorption in a specific and limited frequency range (e.g., usually at the film's resonant frequency) and does not detract from sound absorption over the majority of the frequency range of interest. For example, in FIGS. 9 and 10 as well as in FIG. 7, the microperforated polymeric films provide relatively broad-band sound absorption despite the notches.

Figure 11:
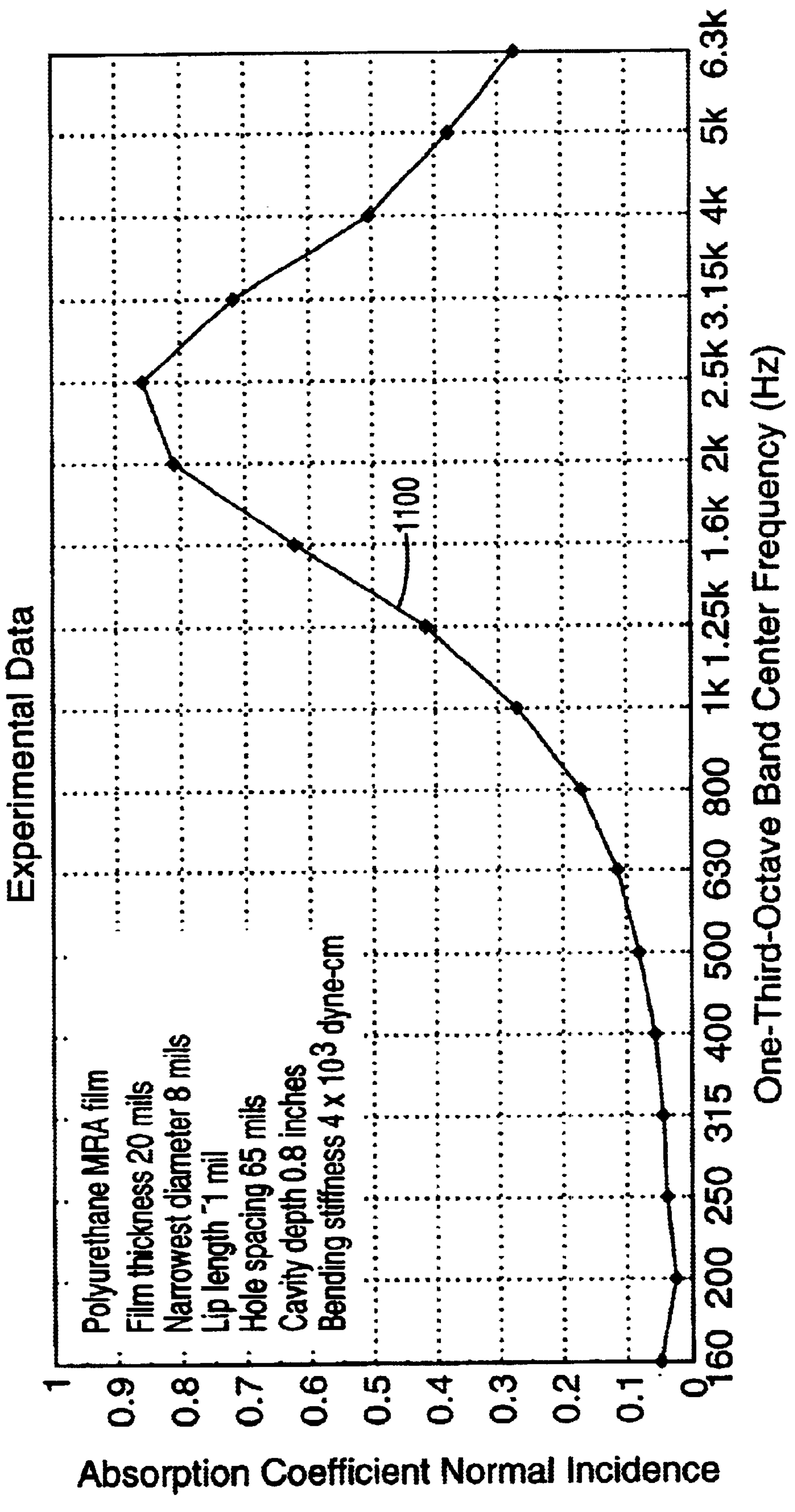

The microperforated polymeric film 410 may further be formed from extremely flexible film (e.g., having a bending stiffness on the order of $10^5$ dyne-cm or less) and still provide adequate sound absorption without requiring substantial external support or thickening strips. Depending on the application, a film of lower bending stiffness may even perform better than a stiffer film. FIG. 11 illustrates the sound absorption spectrum for an extremely flexible microperforated polyurethane film. The exemplary polyurethane film has a bending stiffness of about $4\times10^3$ dyne-cm, a film thickness of 20 mils, a narrowest diameter of 8 mils, a lip length of about 1 mil, a hole spacing of 65 mils and cavity depth of 0.8 inches. Similar results were found using extremely flexible plasticized elastomeric polyvinylchloride (PVC) film. As can be seen from the sound absorption coefficient spectrum 1400, this extremely flexible polyurethane film can provide broad-band sound absorption and has an $R_p$ ratio of about 4. Furthermore, the sound absorption coefficient spectrum 1400 for the exemplary extremely thin and flexible polyurethane film exhibits no notch characteristic of film vibration. This may be as a result of a very low amplitude of vibration or that the resonance frequency of the film occurs at a frequency with a low absorption coefficient.

Figure 22:
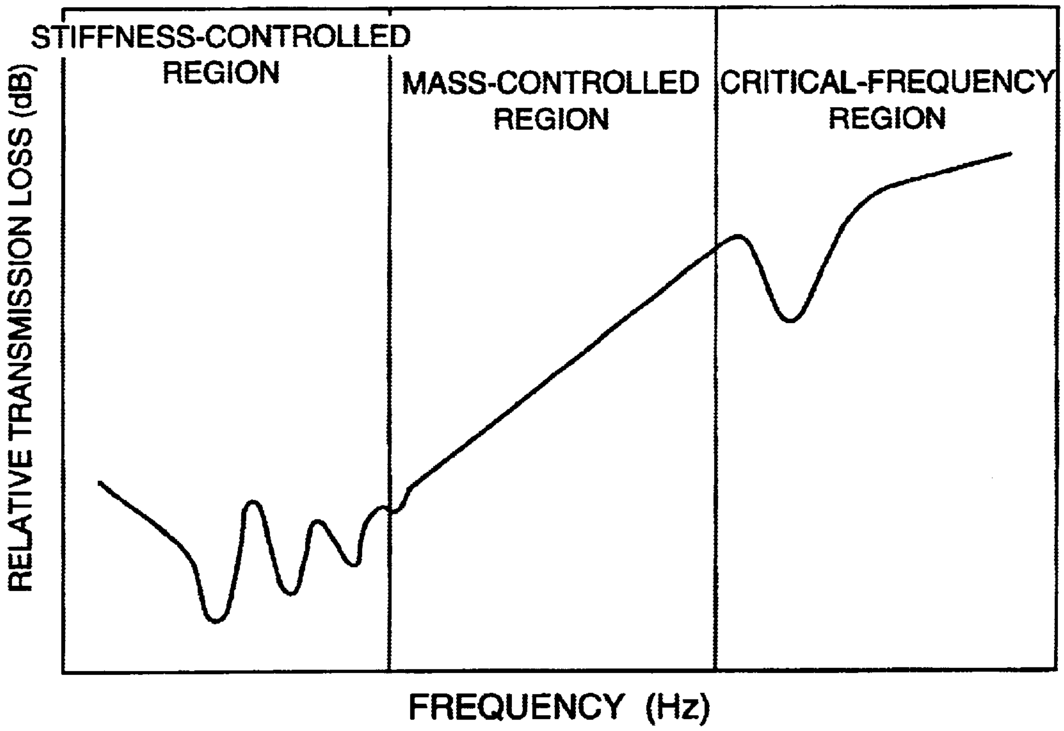
FIG. 22 is a graph illustrating the relationship between noise transmission and frequency.

While film vibration, even at the fundamental resonant frequency, may not substantially impact sound absorption, in some instances it may be desirable to reduce the amplitude of film vibration at a given frequency, shift the fundamental resonant frequency of the film, or arrange the film in such a configuration that resonant motion of the film is unlikely to occur in the frequency range of interest. The invention provides for varying the physical characteristics of polymeric film to achieve such modifications without using stiffening strips as suggested in the art. Vibration of microperforated polymeric film is complex and depends on a number of different factors, including the air pathway provided by the microperforations as well as film bending stiffness, film mass or surface density, film loss factor (i.e., ratio of film loss modulus to elastic modulus), and boundary conditions, such as how the film is supported. A solid material such as a film or panel may exhibit different responses to incident sound, as a function of material properties and frequency, as shown in FIG. 22. Such behavior is typically evaluated in terms of transmission loss or transmission coefficient, which are measures of the percentage of incident sound which is transmitted through a solid material by means of setting the material in motion. While such transmission parameters will not be quantitatively accurate in the case of perforated materials, they may be used as a general representation of the tendency of a material to be set in motion by incident sound, whether the material contains microperforations or not. As shown in FIG. 22, typically three regimes of behavior are found. The first regime is referred to as the "stiffness-controlled" regime. In this regime, the bending stiffness of the film, in combination with the film mass and the boundary conditions established by the method of mounting of the film, controls the tendency of the film to vibrate. The primary vibration in this regime is typically the fundamental resonance vibration of the film, as has been described previously. In the second regime, referred to as the "mass-controlled" regime, the film mass tends to dominate its vibration characteristics. In the third ("critical-frequency") regime, which occurs at the highest frequencies, the tendency of the film to vibrate is again controlled by the bending stiffness, although by a somewhat different mechanism than in the "stiffness-controlled" regime.

Figure 12:
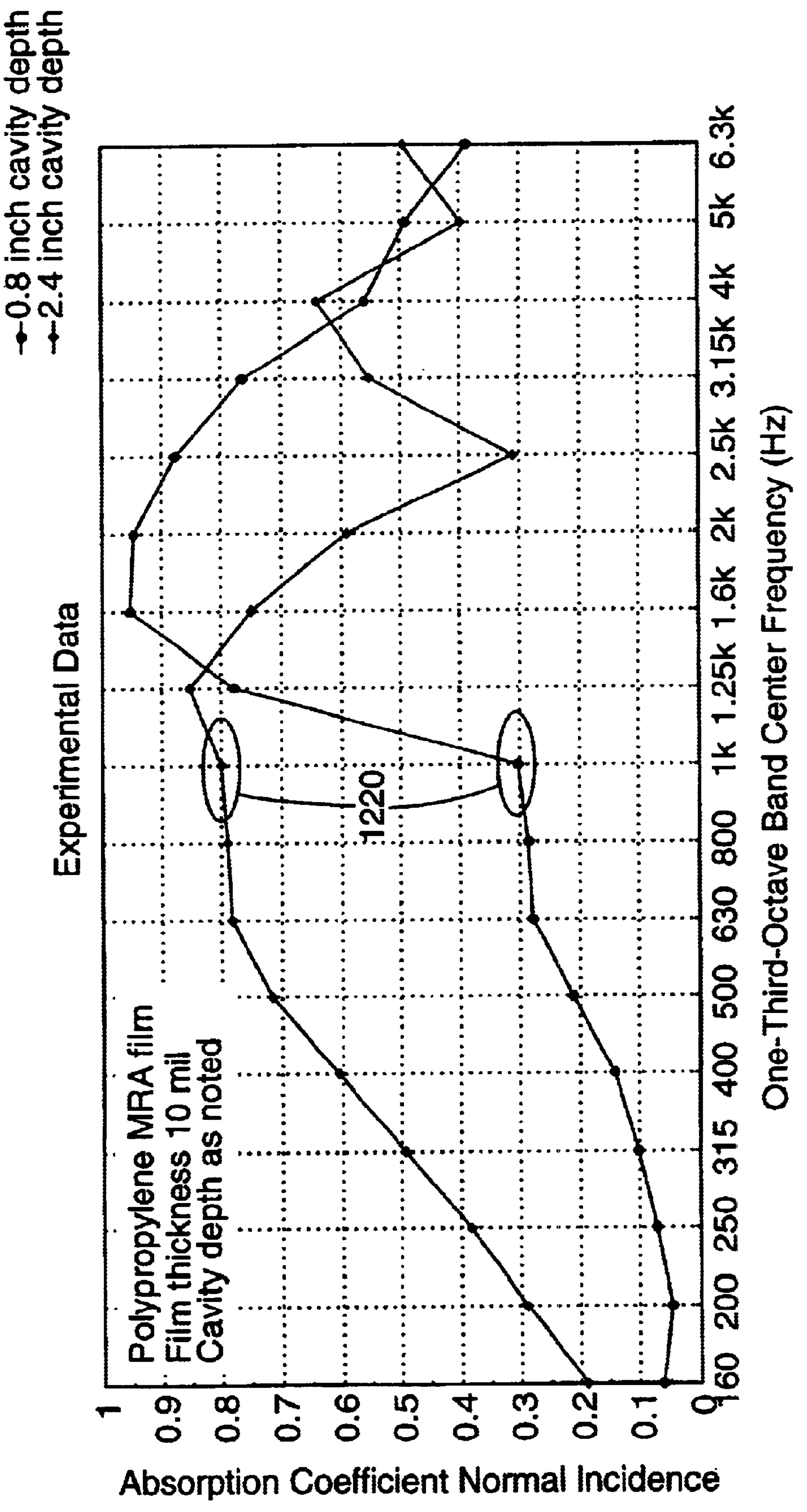
Figure 13:
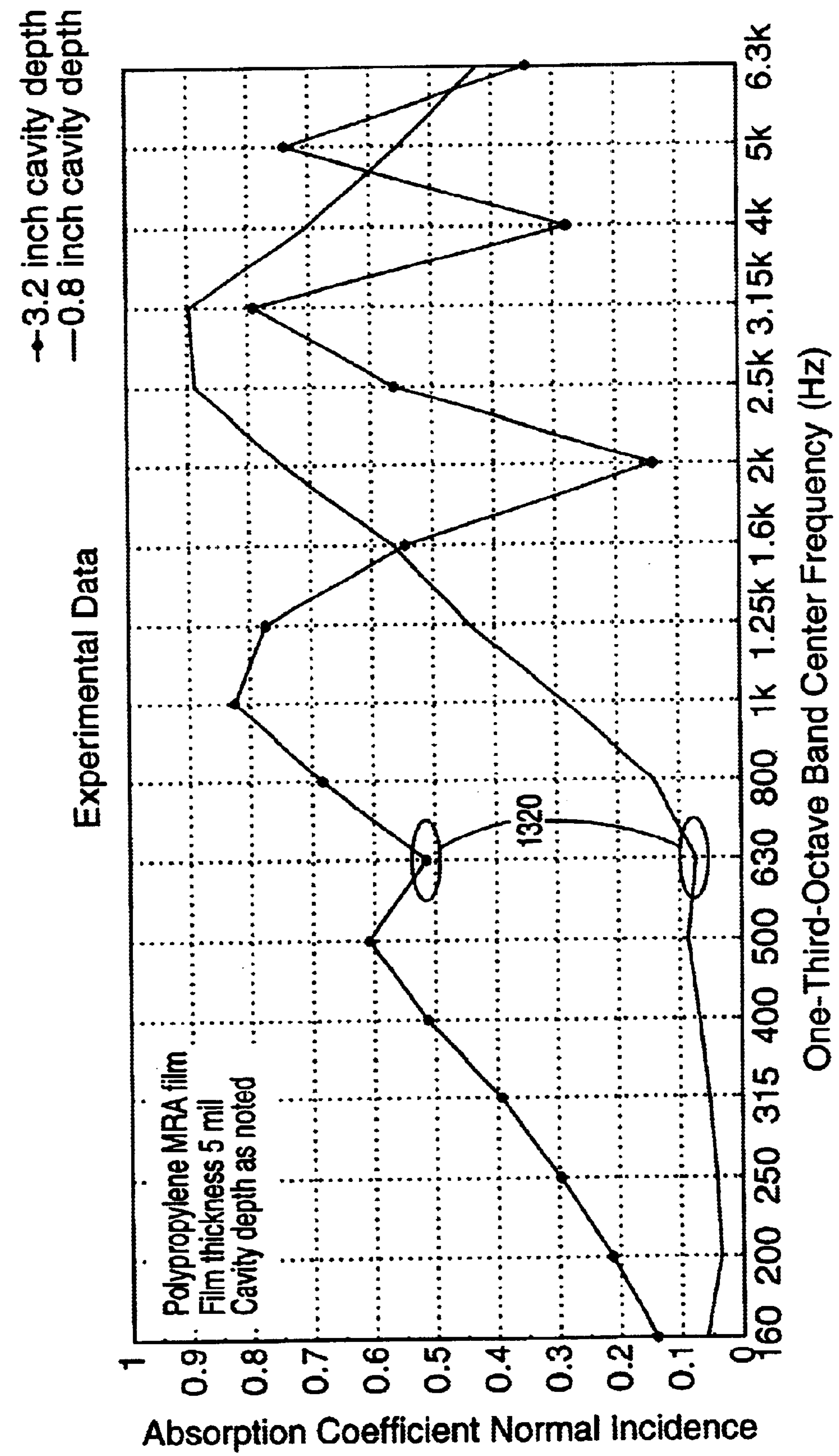

Taking into account the various modes of behavior, the properties of a microperforated film may be selectively varied so as to modify the impact of film vibration on the sound absorption spectrum of the film. For example, the bending stiffness of the film may play a primary role if the film is arranged in such a manner as to operate in the stiffness controlled regime. Ignoring the small holes, bending stiffness ($B_s$) of a film follows the relationship:

$$B_s=F_m/(12t^3) \quad [2]$$

where $F_m$ is the film flexural modulus and t is the thickness. Varying the modulus and/or the film thickness can vary the bending stiffness and shift the resonant frequency. Lowering the bending stiffness by reducing the thickness of the film shifts the resonant frequency of the film lower. A comparison of FIGS. 9–10 and 12–13 is illustrative. As noted above, FIG. 9 illustrates sound absorption coefficient spectrums 902–906 for a microperforated polypropylene film having a bending stiffness of about $1.7\times10^5$ dyne-cm, while FIG. 10 shows sound absorption coefficient spectrums 1002–1010 for a less stiff microperforated polypropylene film having a bending stiffness of about $5.4\times10^4$ dyne-cm. As can be seen in these figures, the notch 1020 in FIG. 10 occurs at a lower frequency than the notch 920 of FIG. 9. FIGS. 12 and 13 illustrate sound absorption spectrums for even thinner and thus less stiff microperforated polypropylene films. In FIG. 12, the notch 1220 has been lowered to 800 to 1000 hertz. In FIG. 13, the notch 1320 has been lowered to about 600 hertz.

While varying the film bending stiffness can shift the frequency of the notch in the sound absorption spectrum (as shown above), it may also affect the magnitude of the notch. For example, the notch 1020 in FIG. 10 is more pronounced than the notch 920 in FIG. 9. Accordingly, the bending stiffness of the microperforated film may be selected, so as to shift the resonant frequency of the film, or to alter the amplitude of film vibration at the resonant frequency, so as to provide the optimal sound absorption coefficient spectrum for the desired application.

In view of the above discussion the bending stiffness may be manipulated so as to shift the frequency of, or alter the magnitude of, the films fundamental resonance frequency. In fact, the bending stiffness may be selected so that the film's fundamental resonance occurs at such a low frequency that the film operates in a mass-controlled manner in the audible range. Finally, the bending stiffness may be selected such that the film's critical frequency is far above the audible range. It is further noted that film of very low bending stiffness (e.g., $<10^5$ dyne-cm) provide good performance in contrast to the teaching in the art. In further contrast with the art, limp and flexible films of very low bending stiffness may be superior to those of higher bending stiffness. For example, films of the present invention are unlikely to exhibit a critical-frequency vibration in the audible range, in contrast to the thick and stiff films of the art, which may be susceptible to vibration via this mechanism.

The mass of a solid material, most commonly represented by its surface density (mass per unit area), may also play a role in the response of the material to incident sound. The useful role of surface density can be easily seen by comparing FIG. 11 with FIGS. 12 and 13. While these films posses similar bending stiffnesses (in the $10^3$–$10^4$ dyne-cm range), the 20 mil polyurethane film of FIG. 11 possesses a higher surface density of 0.05 g/cm$^2$, versus 0.02 g/cm$^2$ for the 10 mil polypropylene film of FIG. 12 and 0.01 g/cm$^2$ for the 5 mil polypropylene film of FIG. 13. The comparison clearly indicates that the high surface density polyurethane film of FIG. 11 does not display a notch as found with the two polypropylene films of FIGS. 12 and 13 which have a lower surface density. While the films of FIGS. 12 and 13 have higher peak breadth ratios $R_p$ than the film of FIG. 13, this results from the differences in hole diameter rather than the differences in surface density.

Further details of the role of film mass will be discussed with reference to FIG. 22. Under certain conditions the mass of a solid material may be the primary determiner of its response to incident sound. This behavior, referred to as "mass-controlled" behavior, is in general more likely to occur in the case of a film of low stiffness and/or large free span. For a given film, the mass controlled regime will occur at higher frequencies than the stiffness controlled regime. Film response in such a case can be discussed with reference to FIG. 14, which illustrates a table of transmission coefficients as a function of frequency and surface density. The transmission coefficient denotes the percentage of incident sound which is transmitted through a solid film by means of setting the solid film into motion. While not quantitatively applicable to the specific percentage of sound transmitted through a microperforated film (in which case sound energy may also pass through the air perforations), such an approach illustrates the degree to which films of given surface density may be susceptible to being set in motion by incident sound, as a function of frequency. As should be appreciated, the transmission coefficients are based on the surface density of the film and are of primary importance in the mass-controlled regime.

As further shown in FIG. 14, the transmission coefficient decreases rapidly with increased frequency for all surface densities. Accordingly, if the sound absorption is primarily intended for high frequency ranges, even films of relatively low surface density have minimal vibration, such that excellent sound absorption performance is obtained. FIG. 14 also illustrates that utilizing a higher surface density film serves to provide a lower transmission coefficient (i.e., reduced vibration) at all frequencies. That is, there will be less tendency for a film of higher surface density to be set in motion by incident sound. This factor is more important in the lower frequency portion of the mass-controlled regime, since, at higher frequencies, even films of lower surface density may provide an adequately high mass impedance. In some cases, such as for lower frequencies, it may be advantageous to utilize a film of high surface density (e.g., by increasing film thickness and/or specific gravity) so as to increase the mass impedance of the film. It is noted, however, that increasing surface density by using a thicker film will also affect the film's bending stiffness. While increasing the film stiffness may serve to further minimize the tendency for the film to be set in motion by incident sound, in some cases, the increased stiffness may serve to bring an unacceptable stiffness-controlled vibration into the frequency range of interest. Thus utilizing a thicker film may be desirable in many cases, but may not be the best approach in every case.

In light of the above discussion, it can be seen that the surface density is a highly useful parameter in optimizing the performance of a microperforated film. For example, surface density may be manipulated so as to shift the fundamental resonance frequency of a film as desired. Alternatively, if conditions are such that the film is used in a mass controlled regime, the surface density may be manipulated so as to decrease the likelihood of film motion in response to incident sound.

The damping ability or internal friction of a film also contributes to the tendency of a film to vibrate in response to incident sound waves. The film mechanical loss factor provides a measurement of the internal friction of a film and is defined as the ratio of film loss modulus to film elastic modulus. A high loss factor may have several effects, including reduction of vibration amplitude at resonance, and more rapid decay of free vibrations, which are highly advantageous in the present application. Films with a high loss factor (e.g., $\geqq 0.1$) are self-damping in nature and, if excited by incident sound, dissipate film motion as heat. The film of the sound absorber may be selected to provide an adequately high loss factor at the temperature of use. For many applications, a polymeric film which has at least one phase with a glass transition temperature ($T_g$) less than or equal to 70° C. or which is formed into a microheterogeneous film structure would be suitable. This may be done by appropriately selecting materials, such as copolymers or blends. Also, as with film bending stiffness and film surface density, additives may be included in the film to enhance the loss factor of the film.

Bending stiffness, surface density, and film loss factor may be controlled without varying film thickness. This is highly advantageous in applications where film thickness is subject to design constraints. These film characteristics may be controlled through selection of the polymeric material and/or through the use of additives. In some cases, these characteristics may be modified independently. This allows even finer optimization of the characteristics of the film. In most instances, an additive will effect each characteristic though to different degrees. In these instances, the additives are controlled to avoid unacceptable stiffness or mass-controlled resonances in the frequency range of interest. For example, it may be advantageous to increase both the surface density and the bending stiffness of the polymeric film where the film is used in an intermediate frequency range in which both the film mass and film stiffness contribute to the film vibration.

With regard to surface density, the specific gravity of the microperforated polymeric film, in particular, provides a highly controllable parameter to modify the surface density and frequency performance of a microperforated polymeric film without varying the thickness. Polymers with a high specific gravity, include polyurethanes and PVC, for example, while polymers such as polyethylene typically have lower specific gravities. Specific gravity may be varied by selective incorporation of additives, such as barium carbonate, barium sulfate, calcium carbonate lead, quartz, and/or clay, for example, into the film during processing. With regard to bending stiffness, the modulus of the polymeric film, provides a highly controllable parameter to modify the bending stiffness and frequency performance of the microperforated polymeric film without varying film thickness. Suitable techniques for varying the modulus of the film include incorporating additives such as carbon black, fumed silica, glass fibers, and various mineral fillers, as well as other substances into the film during the processing. With regard to film loss factor, film materials may be chosen with intrinsically high loss factors (e.g., materials with a glass transition temperature near the use temperature).

Alternatively, additives may be incorporated into the film material so as to provide an elevated loss factor at the temperature of expected use. Such additives may include those which advantageously provide a microheterogeneous structure, particularly in which one or more phases possesses an intrinsically elevated loss factor. Of particular advantage is the use of additives commonly known as plasticizers, which can be used to alter the glass transition temperature of a given polymeric material so as to provide an elevated loss factor at the temperature of use.

Figure 15:
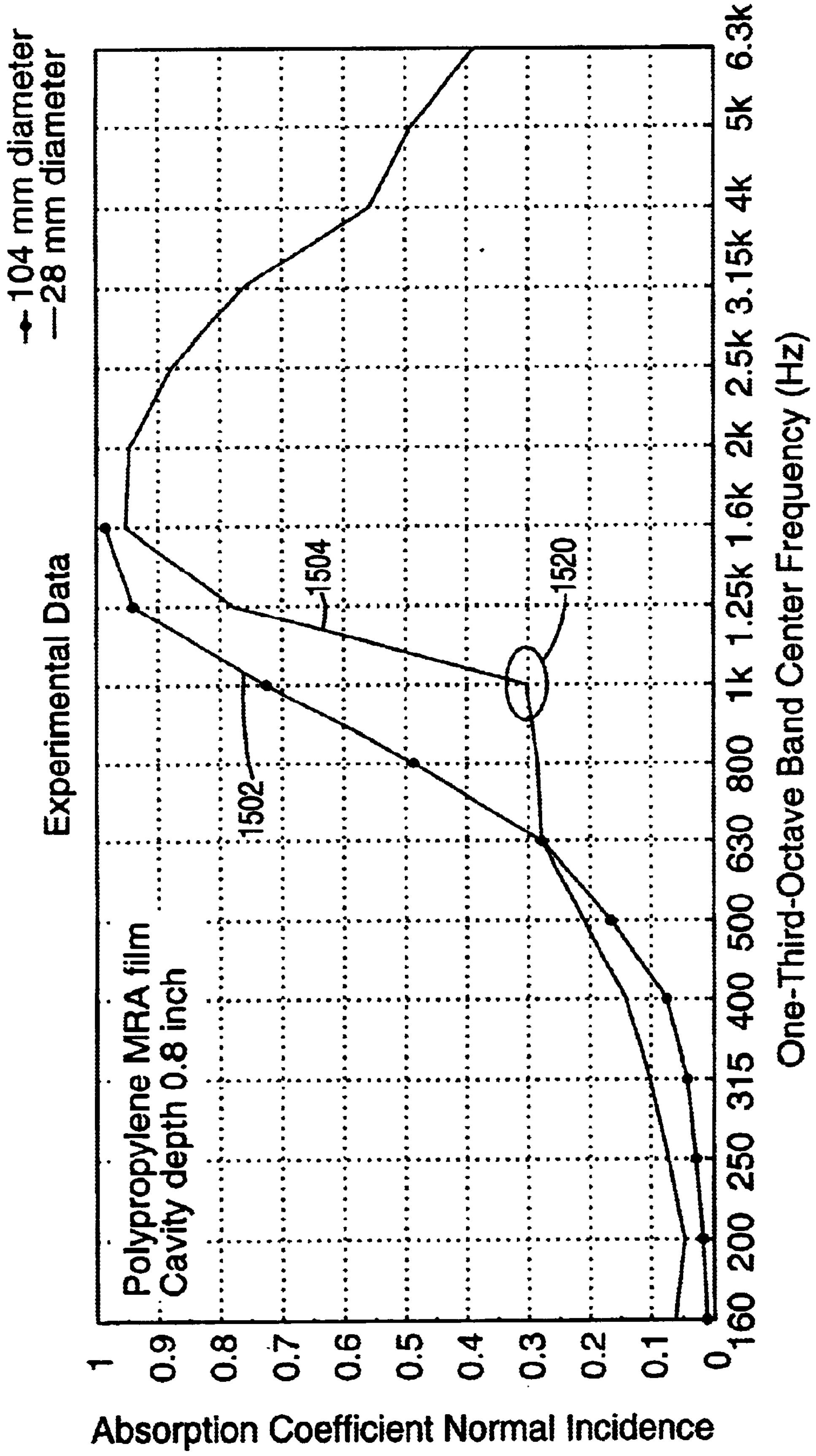
FIG. 15 illustrates exemplary sound absorption spectrums in accordance with yet other embodiments of the invention.

The free span of the microperforated polymeric film can also be selected in consideration of the desired sound absorption spectrum in addition to any physical constraints. For example, the free span of a film may be increased or decreased to shift the film's fundamental resonant frequency out of a range of interest or to move the film between the mass-controlled regime and the stiffness-controlled resonance regime. FIG. 15 illustrates sound absorption spectrums 1502 and 1504 for films with different free spans. As can be seen, the spectrum 1502 for the larger free span (104 mm) film exhibits no notch, while the spectrum 1504 for the smaller free span (28 mm) film exhibits a notch 1520 at about 1000 hertz. Free span may be manipulated in a number of different manners to change the resonant frequency of the film. For example, free span may be controlled by providing periodic contact between the film and a spacing structure so as to manipulate the resonant frequency without immobilizing the film. This may be done by, for example, mounting the film to a border frame of a desired dimension, or placing a spacing structure such as a grid, mesh, lattice or framework of the desired spacing, in contact with the film. While not necessary, the film may be bonded to the spacing structure if desired.

In summary, the invention provides a number of variables which may be manipulated so as to provide an effectively functioning sound absorber, with minimum degradation of performance due to film motion. These include film properties such as thickness, bending stiffness, surface density, and loss modulus, as well as boundary conditions such as the free span. It is noted that the relationships between these variables may be complex and interrelated. For example, changing the film thickness may change the bending stiffness as well as the surface density. Which of these variables has the most effect may depend on yet another variable, for example the free span of the system. Accordingly, these variables should be selected taking into account the application and other constraints (for example cost, weight, resistance to environmental conditions, and so on) to arrive at an optimum design.

Figure 16:
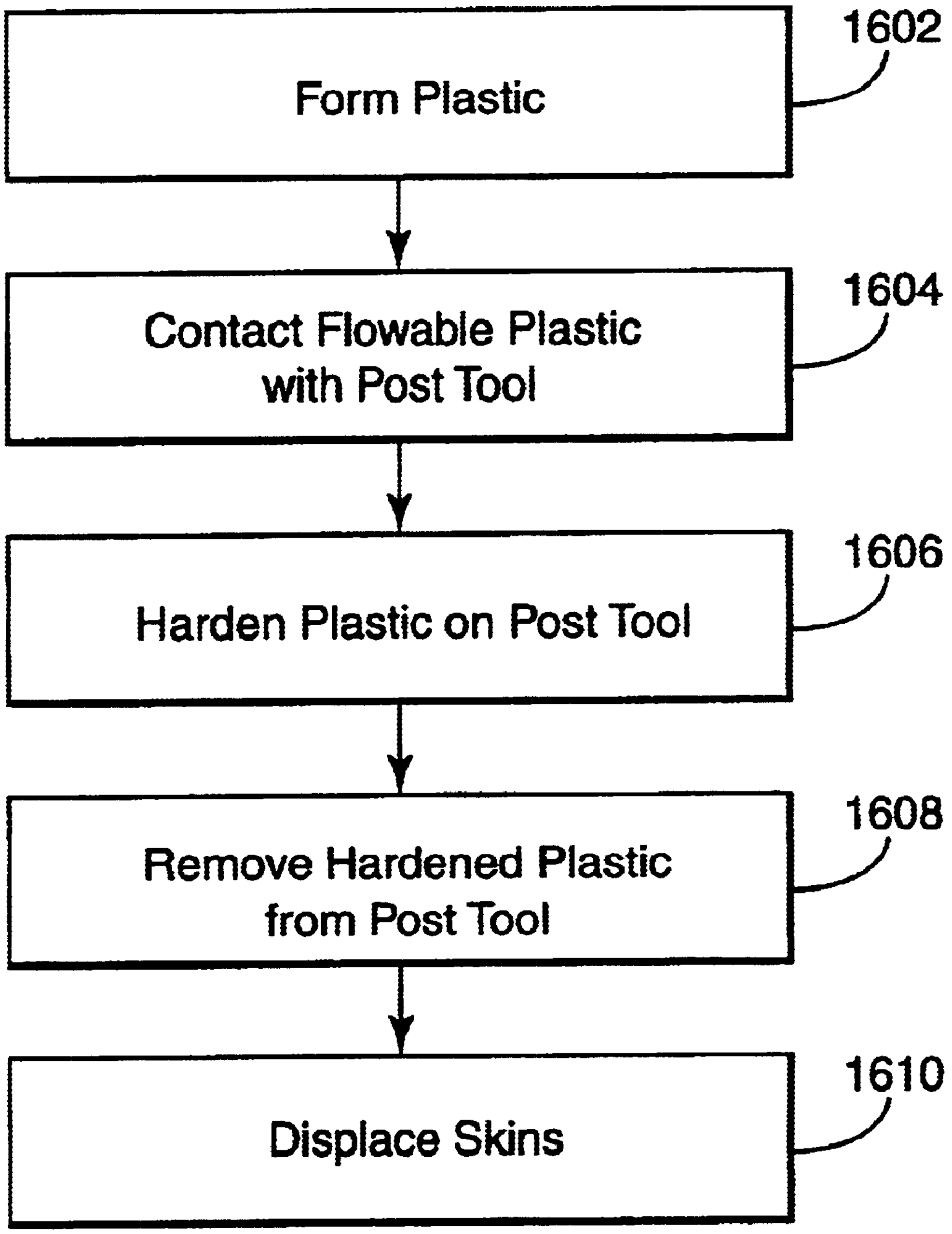
FIG. 16 illustrates an exemplary process flow for forming a microperforated polymeric film in accordance with one embodiment of the invention.

While microperforated films may be formed from many types of polymeric films, including for example, thermoset polymers such as polymers which are cross-linked or vulcanized, a particularly advantageous method of manufacturing a microperforated film utilizes plastic materials. Turning now to FIG. 16, there is illustrated an exemplary process for fabricating a microperforated plastic polymer film for a sound absorption in accordance with one embodiment of the invention. Block 1602 represents forming a plastic material. This may include selecting the type of plastic and additives, if any. Suitable plastics include polyolefins, polyesters, nylons, polyurethanes, polycarbonates, polysulfones, polypropylenes and polyvinylchlorides for many applications. Copolymers and blends may also be used. The type and amount of additives can vary and are typically selected in consideration of the desired sound absorption properties of the film as well as other characteristics of the film, such as color, printability, adherability, smoke generation resistance, heat/flame retardancy and so forth. Additives may, as discussed above, also be added to a plastic to increase its bending stiffness and surface density.

The type of plastic material and additives may also be selected in consideration of the desired uniformity of hole diameter. For example, polyolefins, such as polypropylene, often exhibit extremely regular and uniform holes when made into microperforated film using the techniques described herein. In contrast, some PVC plastic films may exhibit quite irregular holes with ragged edges. Plastic films with relatively large particulate additives may also exhibit irregularly shaped holes with ragged edges. It is noted that the sound absorption characteristics of irregular or regular holes of equivalent average diameter typically behave similarly. Indeed, in some instances, holes with irregular wall surfaces may even be preferred. Moreover, good sound absorption characteristics can be provided with films having additives such as glass fiber, with large particle size. The particle size of the additives may even exceed the dimensions of the hole diameter while still allowing controllable hole formation and without significantly detracting from the film's ability to absorb sound. In some instances, however, it may be advantageous to provide clean and uniform holes. For instance, in environments where air quality is a particular concern, relatively uniform and clean holes would advantageously generate less debris and particulate and thereby provide a cleaner environment.

Block 1604 represents contacting embossable plastic material with a tool having posts which are shaped and arranged to form holes in the plastic material which provide the desired sound absorption properties when used in a sound absorber. Embossable plastic material may be contacted with the tool using a number of different techniques such as, for example, embossing, including extrusion embossing, or compression molding. Embossable plastic material may be in the form of a molten extrudate which is brought in contact with the tooling, or in the form of a pre-formed film which is then heated then placed into contact with the tooling. Typically, the plastic material is first brought to an embossable state by heating the plastic material above its softening point, melting point or polymeric glass transition temperature. The embossable plastic material is then brought in contact with the post tool to which the embossable plastic generally conforms. The post tool generally includes a base surface from which the posts extend. The shape, dimensions, and arrangement of the posts are suitably selected in consideration of the desired properties of the holes to be formed in the material. For example, the posts may have a height corresponding to the desired film thickness and have edges which taper from a widest diameter to a narrowest diameter which is less than the height of the post in order to provide tapered holes, such as the hole shown in FIG. 7.

Block 1606 represents solidifying the plastic material to form a solidified plastic film having holes corresponding to the posts. The plastic material typically solidifies while in contact with the post tool. After solidifying, the solidified plastic film is then removed from the post tool as indicated at block 1608. In some instances, the solidified plastic film may be suitable for use in a sound absorber without further processing. In many instances, however, the solidified plastic film includes thin skins covering or partially obstructing one or more holes. In these cases, as indicated at block 1610, the solidified plastic film typically undergoes treatment to displace any skins covering or partially covering the holes.

Skin displacement may be performed using a number of different techniques including, for example, forced air treatment, hot air treatment, flame treatment, corona treatment, or plasma treatment. Such treatments serve to displace and remove the skins without affecting the bulk portion of the film due to the relatively high mass of the bulk portion of the film as compared to the thin skin. Depending on the type of displacement treatment, the skin may, for example, be radially displaced to form an outward lip or blown out of the hole as debris. In the latter case, cleaning methods can be effectively used to remove any small amount of residue occurring from displacing the skin.

When using thermal displacement treatment, such as a flame treatment, to displace the skins, the thermal energy is typically applied from the side of the film bearing the skin while a metal surface (e.g., a roll) acting as a heat sink, may be provided against the opposite surface, to draw heat from the bulk portions so that the bulk portions of the film do not deform during the thermal displacement treatment. During the thermal energy treatment, the film may also be maintained under tension during and/or after the thermal energy treatment to assist in opening the holes. This may be done, for example, by applying positive pressure or vacuum to one side of the film.

Figure 17:
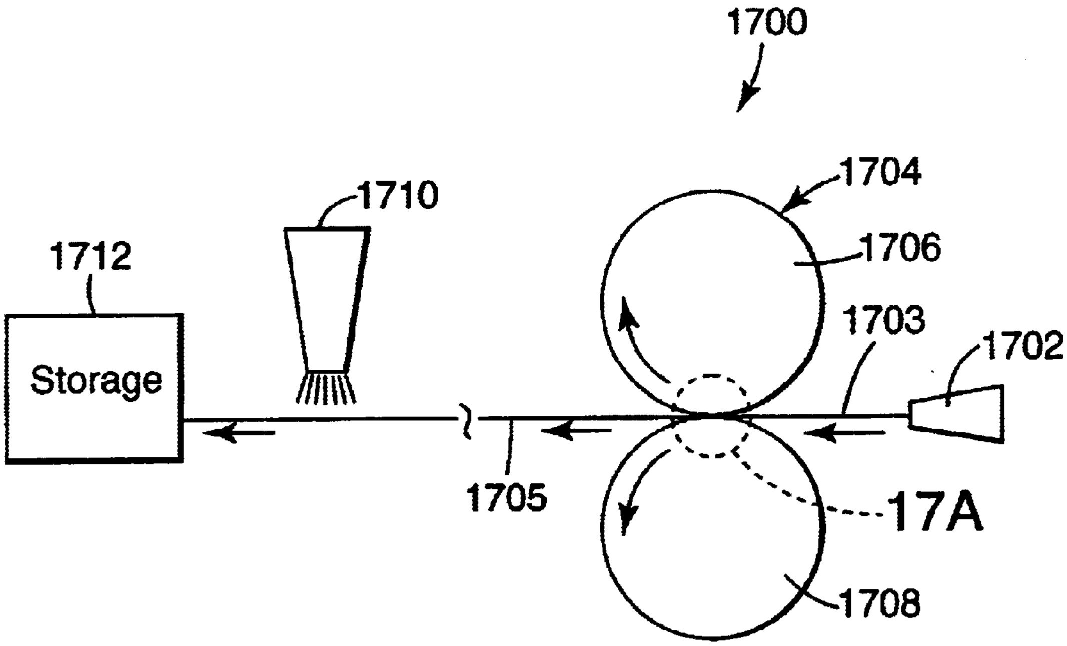
FIG. 17 illustrates an exemplary fabrication system for forming a microperforated polymeric film in accordance with another embodiment of the invention.
Figure 17A:
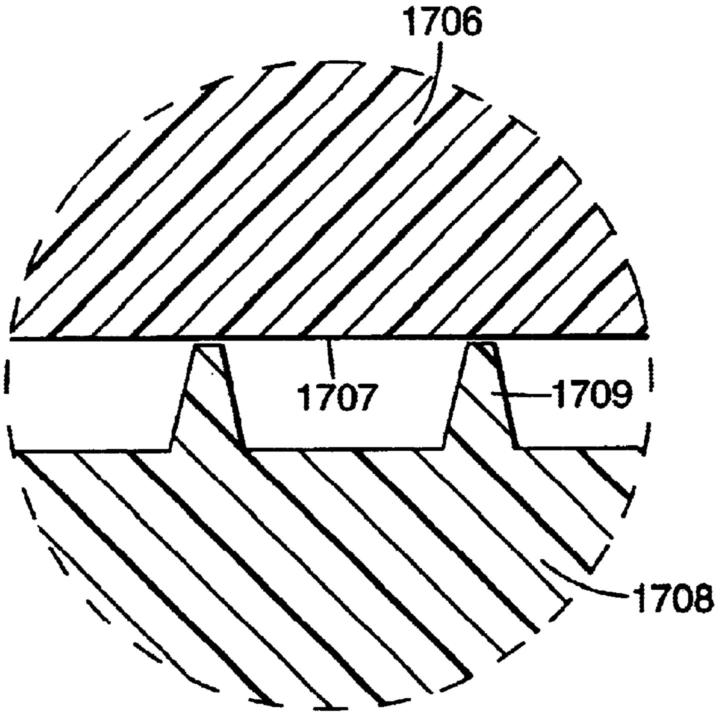

FIG. 17 illustrates a schematic diagram of an exemplary extrusion embossing system for forming microperforated plastic film in accordance with one embodiment of the invention. The exemplary extrusion embossing system 1700 generally includes an extrusion die 1702 from which embossable plastic film 1703 is extruded. The extrusion die 1702 lies in fluid communication with a nip roll system 1704 which includes a first roll 1706 having a generally flat exterior surface 1707 and a second roll 1708 having posts 1709 on its exterior surface. The embossable plastic 1703 generally flows between the rolls 1706 and 1708, conforms to the post 1709, and solidifies. The film 1705 then moves out of the nip roll system 1704 to a storage bin 1712 for storage. The storage bin 1702 may, for example, be a winding roll upon which the solidified film is wound. Alternatively, the storage bin 1712 may be a sheet bin which stores cut sheets of the plastic film 1705. The exemplary system 1700 may further include a displacement treatment system 1710 for displacing skins covering the perforations. The displacement system 1710 may be provided in-line between the nip roll system at 1704 and the storage bin 1712 as illustrated. Alternatively, the displacement treatment system 1710 may be an out-of-line system. In this case, stored microperforated plastic film from the storage bin 1712 is moved to another assembly line having the displacement treatment system 1710. While a roll-based process provides significant cost savings, a step wise process using, for example, a sheet-like tool post system, rather than a nip roll system, may alternatively be used.

The microperforated polymeric films and processing techniques discussed above provide a number of advantages. As compared to conventional fibrous materials and perforated sheet materials, the above microperforated polymeric films are relatively inexpensive to form and are capable of wider use. The use of post molding provides a relatively inexpensive method of forming high aspect ratio holes. The use of post molding also provides significant quality advantages over other methods of generating perforations in films. For example, post molding generates significantly less debris or particulate matter than, for example, mechanical punching, drilling or boring techniques. The above process also allows for continuous processing and can provide significant cost savings over conventional processing methods.

The above microperforated polymeric films are also suitable for use in a wider range of environments, including those with highly sensitive air quality and high tendencies for heat or fire. For example, a wide variety of additives may be incorporated into a microperforated polymeric film to provide desirable characteristics, such as flame retardancy, heat resistance, UV resistance, etc. The microperforated polymeric films can further provide effective sound absorption, including broad-band sound absorption, without requiring expensive hole formation processing. The relatively flexible nature of the film also increases its opportunity for use. For example, relatively flexible film allows for easy attachment and/or detachment of the film to other structures. The film may even be used removably to allow access to the cavity and/or the reflecting surface defining the cavity. The film may also be transparent thereby allowing a visible inspection of the cavity or reflecting surface.

A few of the many applications for sound absorbers using microperforated polymeric film will now be discussed. It should be appreciated however that the invention is not limited to the small number of examples provided in the discussion which follows. Sound absorbers using microperforated polymeric film may be manufactured in a single unit, such as a panel which includes the microperforated polymeric film, a reflecting surface, and a spacing structure which provides a desired spacing between the film and the reflecting surface. Alternatively, a similar sound absorber panel may be formed without the reflecting surface. In this case, the microperforated polymeric film-based sound absorber panel may be disposed near an existing reflecting surface. The spacing structure may simply include walls which contact edges and/or interior portions of the microperforated film. In other embodiments, microperforated film-based sound absorbers may be formed using existing surfaces and spacing structures. For instance, a microperforated polymeric film may be attached, e.g. by an adhesive, to the underside (e.g., edges) of a car hood using part of the surface of the car hood (e.g., the edges) for support and part of the hood surface (e.g., an interior portion) as a reflecting surface. In further embodiments, multiple layers of microperforated polymeric film may be spaced apart near a reflecting surface to absorb sound.

Figure 18:
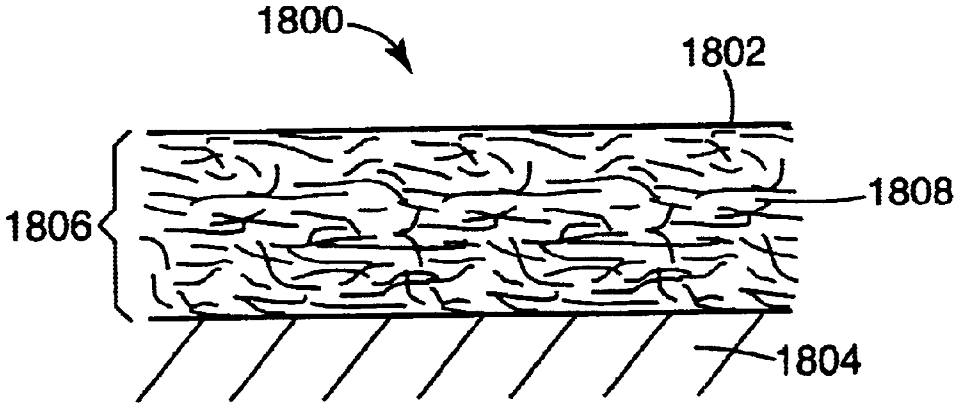
FIG. 18 illustrates an exemplary sound absorber in accordance with another embodiment of the invention.

One particular advantageous use of a microperforated polymeric film is in combination with a fibrous material. FIG. 18 illustrates a sound absorber 1800 including a microperforated polymeric film 1802 disposed near a reflecting surface 1804 to define a cavity 1806 therebetween and a fibrous material 1808 disposed in at least part of the cavity 1806. The type of fibrous material 1808 can vary and, while not limited thereto, may be of a type illustrated in U.S. Pat. Nos. 4,118,531 and 5,298,694. The fibrous material 1808 may simply be disposed between the reflecting surface 1804 and the film 1802 or may be bonded to the microperforated polymeric film 1802, if desired. Bonding may, for example, be done by partially melting the materials together, such as by calendering, or by using an applied adhesive.

Figure 19:
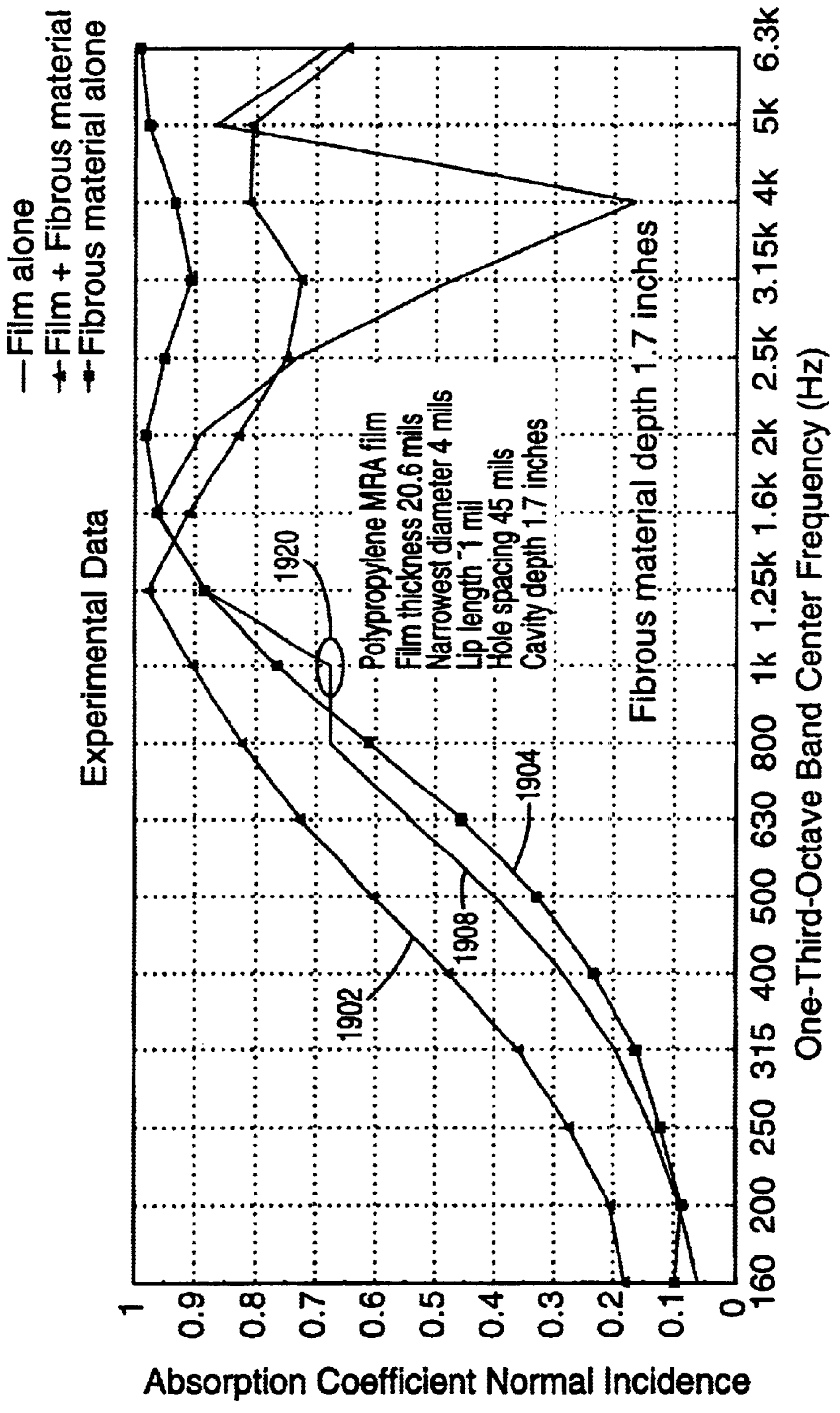
FIG. 19 illustrates exemplary sound absorption coefficient spectrums in accordance with embodiments of the invention.

FIG. 19 illustrates a sound absorption spectrum 1902 for a sound absorber 1800 having tapered holes, a film thickness of 21.6 mils, a narrowest diameter of 4 mils, a lip of 1 mil, and a hole spacing of 45 mils, and a cavity depth of 1.7 inches filled with a thermoplastic fibrous material as disclosed in U.S. Pat. No. 5,298,694. Also shown in FIG. 19 are a sound absorption spectrum 1904 for a 1.7 inch thick thermoplastic fibrous material alone and a sound absorption spectrum 1908 for the polymeric film alone. As can be seen, the microperforated polymeric film-fibrous material combination provides improved low frequency sound absorption over the fibrous material or microperforated film alone.

The fibrous material 1808 generally slows the speed of sound in the cavity 1806, thereby enlarging the effective depth of the cavity and shifting the sound absorption spectrum toward lower frequencies. In addition to improving low frequency performance, the fibrous material 1808 can also increase the sound absorption around the primary node of the microperforated polymeric film 1902. The use of a fibrous material 1806 in the cavity 1808 can also serve to minimize film vibration. For example, in FIG. 19, the 1000 Hertz notch 1920 characteristic of the microperforated film 1802 is not present when used with the fibrous material 1806. It should be noted that, in this case, the amplitude of film vibration is reduced by means of vibration damping provided by the fibrous material, rather than by rigidifying support as taught in the art. Thus, a highly flexible and conformable construction may be obtained which provides excellent sound absorption. The microperforated polymeric film-fibrous material combination also overcomes some of the disadvantages to the use of fibrous material alone. For example, the microperforated polymeric film 1802 can be used to provide flame retardancy and can serve to prevent particulate contamination from the fibrous material 1806. In another embodiment, the fibrous material 1806 is provided on the outer surface of microperforated polymeric film 1802 away from the reflecting surface 1804. While some advantages, such as flame retardancy and contamination control, may be lost, this embodiment may provide improved sound absorption at higher frequencies.

Figure 20:
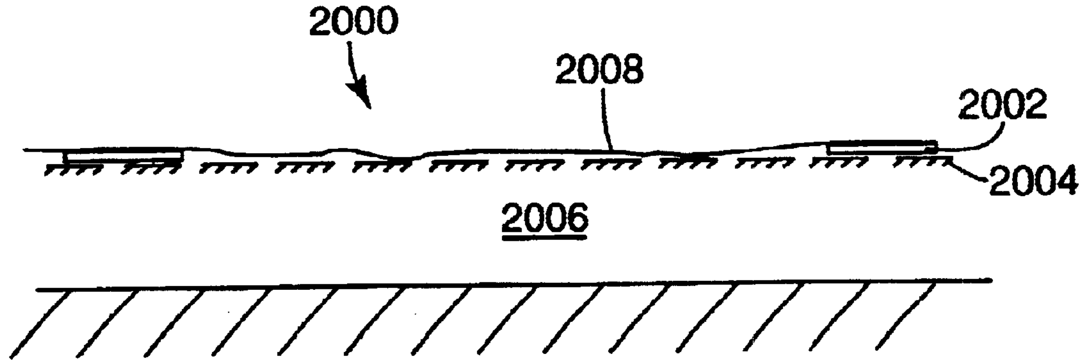
FIG. 20 illustrates an exemplary barrier sound absorber in accordance with another embodiment of the invention.

FIG. 20 illustrates an exemplary barrier sound absorber in accordance with another embodiment of the invention. The barrier sound absorber 2000 includes a microperforated polymeric film 2002 disposed near a reflecting surface 2004 to form a cavity 2006 therebetween and a relatively thin unperforated film 2008 which is sound transmissive and which has adequate barrier properties. The film 1908 may, for example, provide a barrier to liquid or dust particles. The thickness of the polymeric material used for this film 2008 is typically selected in consideration of the requisite surface density. Typically, the barrier film 2008 has a surface density of about 0.01 g/cm$^2$ or less in order to provide adequate sound transmission. Suitable thicknesses are typically about 5 mils or less. Suitable materials for the film 2008 include polymers such as polyvinylidine chloride (PVDC) (e.g., Saran Wrap™, which typically has a thickness of 4 mils or less), and other materials such as polypropylene, polyethylene, polyester and so forth. The characteristics of this microperforated polymeric film can vary as desired.

Figure 21:
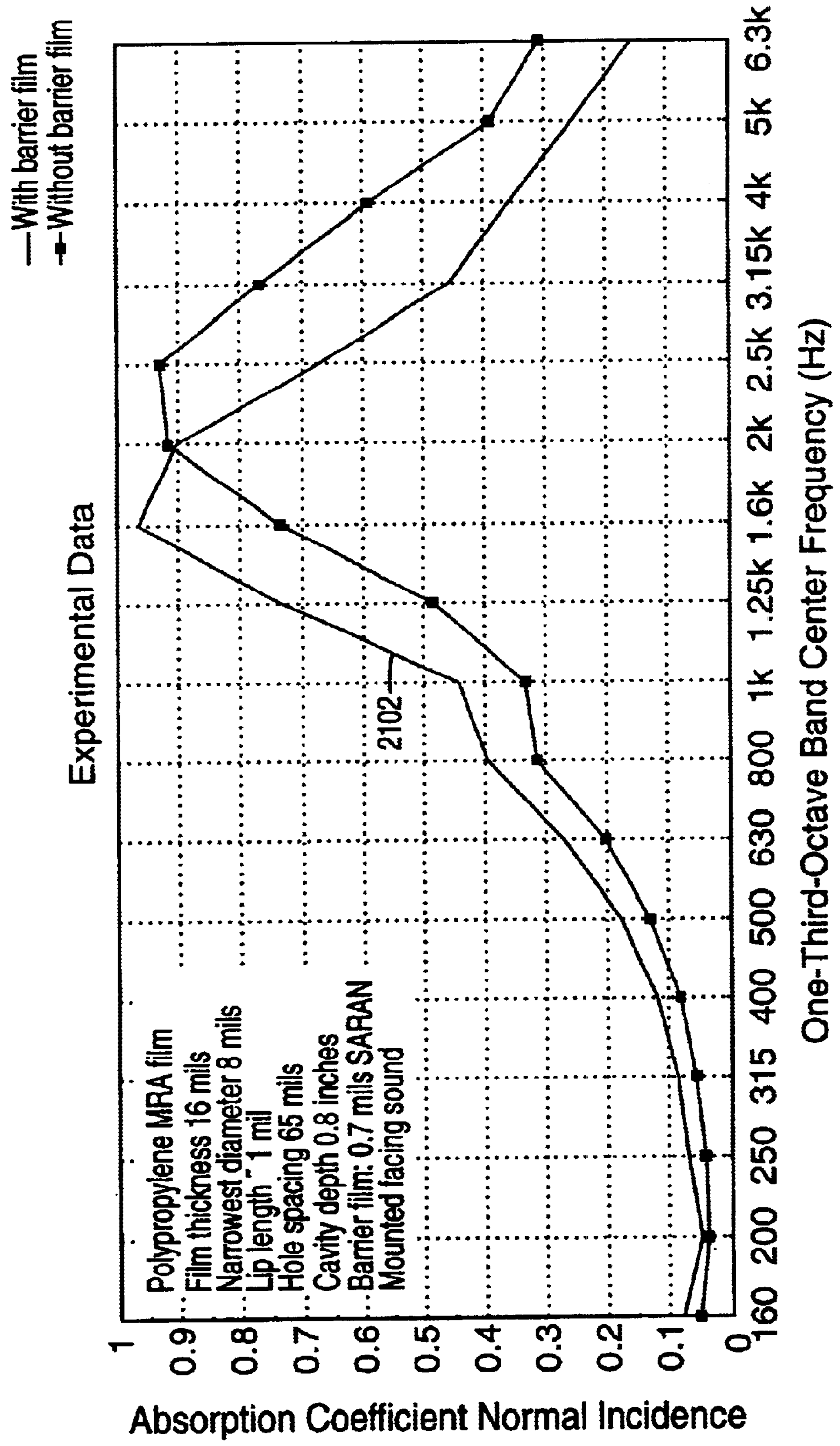
FIG. 21 illustrates various sound absorption spectrums in accordance with further embodiments of the invention.

The unperforated barrier film 2008 is typically placed on the outer surface of the microperforated polymeric film 2002 opposite the reflecting surface 2004. While this placement provides better sound absorption, the barrier film 2008 may be placed on the inner surface of the microperforated polymeric film 2002 if desired. FIG. 21 illustrates a sound absorption spectrum 2102 for a sound absorber 2000 having a 4 mil sheet of saran™ barrier film PVDC and a microperforated polypropylene film having tapered holes, a film thickness of 16 mils, a narrowest diameter of 8 mils, a 1 mil lip, a hole spacing of 65 mils, and a cavity depth of 0.8 inches. As can be viewed, the spectrum 2102 provides excellent sound absorption, especially at lower frequencies which may be advantageous in many cases. Should higher frequency absorption be desired, the properties of the microperforated polymeric film may be optimized to provide such high frequency absorption.

The method of mounting the barrier film 2008 near the microperforated film 2002 can vary, provided the barrier film 2008 is allowed to vibrate. For example, the two films 2002 and 2008 may be mounted together by using a double-faced laminating adhesive 2010 between the two films 2002 and 2008, typically along the edges of the two films 2002 and 2008. Alternatively, for example, the barrier film 2008 may adhered to the microperforated polymeric film 2002 from above. In either case, relatively similar sound absorption spectrums are obtained. The materials for the two films 2002 and 2008 are typically selected taking into account the interaction between the two films 2002 and 2008. In particular, the material types are selected to minimize interaction, such as bonding or sticking, between the two films 2002 and 2008 which would determinally impact barrier film vibration. For example PVDC/PVC and PVDC/polyurethane combinations are typically avoided. It should be appreciated that while some degree of contact between the films may not adversely affect the sound absorption performance, intimate contact between the films, in the form of sticking or wetting out, particularly over large portions of the film surface, may decrease the ability of the barrier film 1908 to vibrate and transmit sound therethrough. Accordingly, this will result in increased sound reflection which may reduce the sound absorption of the sound absorber.

The tendency of the two films 2002 and 2008 to stick or bond also depends on the characteristics of the film surfaces. Typically, rougher surfaces tend to decrease the bonding or stickiness between the two films. Accordingly, the barrier film 2008 is typically placed against the side of the microperforated film 2002 having the widest diameter which is typically rougher than the side of the film 2002 with the narrowest diameter.

As noted above, the present invention is applicable to a number of different microperforated polymeric films and sound absorbers using such films. Accordingly, the present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications, processes and structures.

What is claimed is:

1. A microperforated polymeric film sound absorber, comprising:

a surface; and a microperforated polymeric film having a bending stiffness of $10^7$ dyne-cm or less disposed near the surface such that the film and the surface define a cavity therebetween, the film including a plurality of microperforations having a narrowest diameter of 20 mils or less and a relatively large free span portion spanning at least part of the cavity;

wherein the relatively large free span portion has a length of about 100 mils or more;

wherein the sound absorber does not include other microperforated films.

2. The microperforated film sound absorber of claim 1, wherein, in response to incident soundwaves at a particular frequency in the audible frequency spectrum, the sound absorber absorbs sound and the free span portion of the microperforated film vibrates.

3. The microperforated film sound absorber of claim 2, wherein the film vibration produces a notch in a sound absorption spectrum of the film.

4. The microperforated film sound absorber of claim 2, wherein the particular frequency is the fundamental resonant frequency of the film.

5. The microperforated film sound absorber of claim 4, wherein the sound absorber has a sound absorption coefficient of 0.4 or greater at the fundamental resonant frequency.

6. The microperforated film sound absorber of claim 1, wherein the microperforated film has a thickness less than 80 mils.

7. The microperforated film sound absorber of claim 1, wherein the microperforations each have a narrowest diameter of 15 mils or less.

8. The microperforated film sound absorber of claim 7, wherein the microperforated film thickness is substantially uniform over the entire microperforated film.

9. The microperforated film sound absorber of claim 7, wherein the microperforations each have a narrowest diameter less than the film thickness.

10. The microperforated film sound absorber of claim 7, wherein the microperforations each have a narrowest diameter of 10 mils or less.

11. The microperforated film sound absorber of claim 7, wherein the microperforations each have a narrowest diameter of 6 mils or less.

12. The microperforated film sound absorber of claim 1, wherein the microperforations are tapered.

13. The microperforated film sound absorber of claim 12, wherein the microperforations each have a widest diameter and a narrowest diameter, the narrowest diameter being less than the microperforation film thickness.

14. The microperforated film of claim 1, wherein the film has a bending stiffness of $10^6$ dyne-cm or less.

15. The microperforated film of claim 1, wherein the film has a bending stiffness of $10^5$ dyne-cm or less.

16. The microperforated film of claim 15, wherein the film has a surface density of about 0.025 g/cm$^2$ or more.

17. The microperforated film of claim 1, wherein the film has a mechanical loss factor of 0.1 or more at room temperature and at audible frequency.

18. The microperforated film sound absorber of claim 1, wherein the film includes at least one phase with a glass transition temperature 70° C. or less.

19. The microperforated film sound absorber of claim 1, further including a spacing structure disposed between the microperforated film and the surface for spacing the microperforated film from the surface.

20. The microperforated film sound absorber of claim 19, wherein the spacing structure, the surface, and the microperforated film are an integral unit.

21. The microperforated film sound absorber of claim 19, wherein the microperforated film and the spacing structure are an integral unit.

22. The microperforated sound absorber of claim 1, wherein the cavity has a depth ranging from about 0.25 to 6 inches.

23. A sound absorber, comprising:

a surface;

a microperforated film disposed near the surface such that the film and the surface define a cavity therebetween, the film including a plurality of microperforations having a narrowest diameter of 20 mils or less; and a thermoplastic sound absorbing fibrous material disposed adjacent the microperforated film.

24. The sound absorber of claim 23, wherein the fibrous material is adjacent a side of the microperforated film opposite the surface.

25. The sound absorber of claim 23, wherein the fibrous material is adjacent a side of the microperforated film facing the surface.

26. The sound absorber of claim 23, wherein the microperforated film and the fibrous material are an integral unit.

* * * * *